(12) United States Patent
Suib et al.

(10) Patent No.: US 10,822,246 B2
(45) Date of Patent: Nov. 3, 2020

(54) MESOPOROUS METAL OXIDES, PREPARATION AND APPLICATIONS THEREOF

(71) Applicant: University of Connecticut, Farmington, CT (US)

(72) Inventors: Steven L. Suib, Storrs, CT (US); Zhu Luo, Wuhan (CN)

(73) Assignee: University of Connecticut, Farmington, CT (US)

( * ) Notice: Subject to any disclaimer, the term of this patent is extended or adjusted under 35 U.S.C. 154(b) by 656 days.

(21) Appl. No.: 15/600,432

(22) Filed: May 19, 2017

(65) Prior Publication Data

US 2017/0349447 A1   Dec. 7, 2017

Related U.S. Application Data

(60) Provisional application No. 62/340,441, filed on May 23, 2016.

(51) Int. Cl.
  *B01J 23/10*    (2006.01)
  *B01J 23/32*    (2006.01)
  (Continued)

(52) U.S. Cl.
  CPC .............. *C01G 39/02* (2013.01); *C25B 1/04* (2013.01); *C25B 11/04* (2013.01); *H01G 11/24* (2013.01); *H01G 11/46* (2013.01); *H01G 11/86* (2013.01); *H01M 4/8605* (2013.01); *H01M 4/9016* (2013.01); *C01P 2002/82* (2013.01);
  (Continued)

(58) Field of Classification Search
  CPC ........... C01G 39/02; C25B 1/04; C25B 11/04; H01M 4/9016; H01M 4/8605; H01M 4/483; H01M 4/48; H01G 11/24; H01G 11/46; H01G 11/86; Y02E 60/366; C01P 2006/16; C01P 2006/12; C01P 2006/40;
  (Continued)

(56) References Cited

U.S. PATENT DOCUMENTS

2011/0027572 A1\*  2/2011  Wiesner ................. C01B 13/18
                                                           428/315.5
2013/0122723 A1\*  5/2013  Vail ..................... H01L 21/2686
                                                           438/795

OTHER PUBLICATIONS

Luo, Zhu, "Synthesis of Crystalline, Mesoporous Metal Oxide Catalysts for Environmental and Energy Applications" Feb. 26, 2016. Doctoral Dissertations. 1040. https://opencommons.uconn.edu/dissertations/1040 (Year: 2016).\*

\* cited by examiner

*Primary Examiner* — Haytham Soliman
(74) *Attorney, Agent, or Firm* — Locke Lord LLP; Scott D. Wofsy; Nicholas J. DiCeglie, Jr.

(57) ABSTRACT

This disclosure provides a unique approach for the synthesis of non-stoichiometric, mesoporous metal oxides with nano-sized crystalline wall. The as-synthesized mesoporous metal oxide is very active and stable (durability >11 h) electocatalyst in both acidic and alkaline conditions. The intrinsic mesoporous metal oxide serves as an electrocatalyst without the assistant of carbon materials, noble metals, or other materials, which are widely used in previously developed systems. The as-synthesized mesoporous metal oxide has large accessible pores (2-50 nm), which are able to facilitate mass transport and charge transfer. The as-synthesized mesoporous metal oxide requires a low overpotential and is oxygen deficient. Oxygen vacancies and mesoporosity served as key factors for excellent performance.

8 Claims, 27 Drawing Sheets

(51) Int. Cl.
*B01J 23/00* (2006.01)
*B01J 23/40* (2006.01)
*C01G 39/02* (2006.01)
*H01M 4/90* (2006.01)
*H01M 4/86* (2006.01)
*H01G 11/24* (2013.01)
*H01G 11/46* (2013.01)
*H01G 11/86* (2013.01)
*C25B 1/04* (2006.01)
*C25B 11/04* (2006.01)
*H01M 4/48* (2010.01)

(52) U.S. Cl.
CPC ...... *C01P 2002/84* (2013.01); *C01P 2002/85* (2013.01); *C01P 2004/03* (2013.01); *C01P 2006/12* (2013.01); *C01P 2006/16* (2013.01); *C01P 2006/40* (2013.01); *H01M 4/48* (2013.01); *H01M 4/483* (2013.01); *Y02E 60/36* (2013.01)

(58) Field of Classification Search
CPC .............. C01P 2002/82; C01P 2002/85; C01P 2004/03; C01P 2002/84
USPC ........................................................ 502/321
See application file for complete search history.

FIG. 17C
FIG. 17D
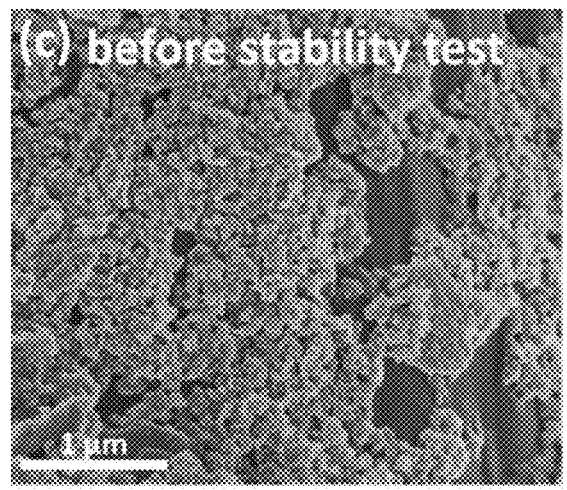
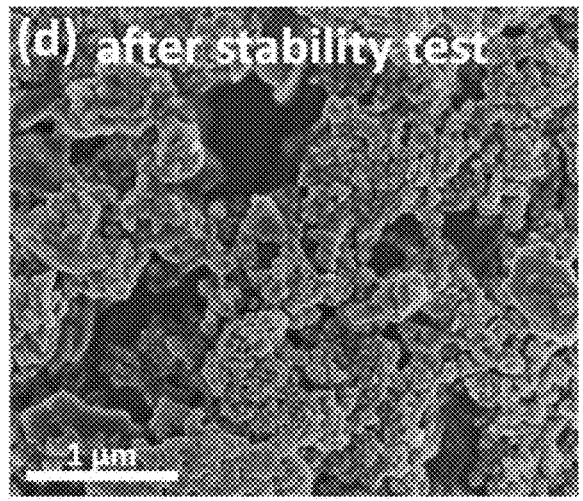
FIG. 18A
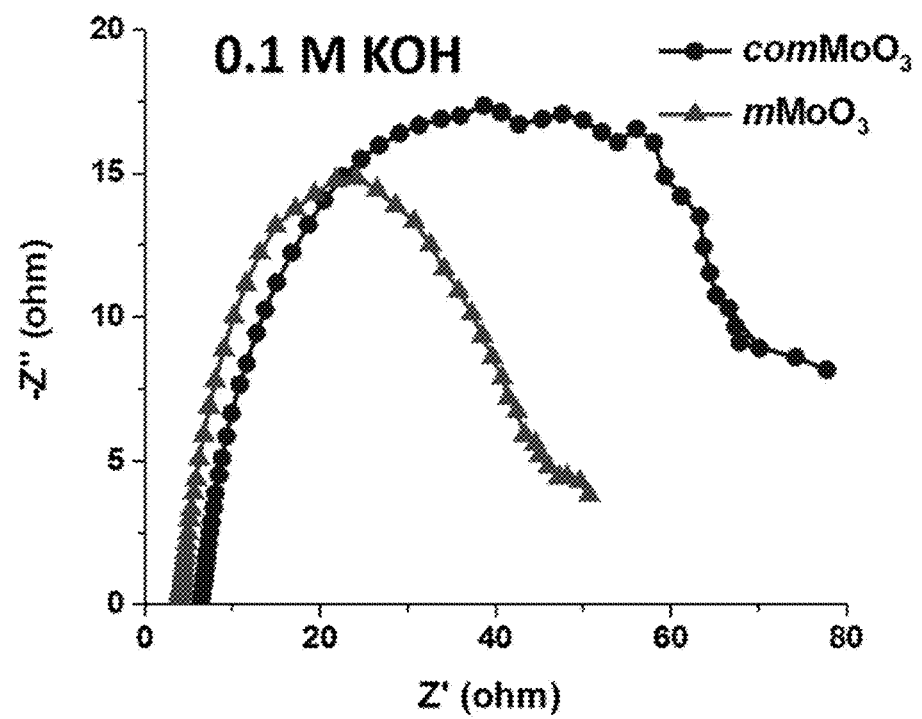

MESOPOROUS METAL OXIDES, PREPARATION AND APPLICATIONS THEREOF

RELATED APPLICATIONS

This application is related to U.S. patent application Ser. No. 14/037,100 filed on Sep. 25, 2013, and claims the benefit of U.S. Provisional Patent Application Ser. No. 62/340,441, filed on May 23, 2016, titled "MESOPOROUS METAL OXIDES, PREPARATION AND APPLICATIONS THEREOF", both of which are incorporated herein by reference in their entities.

STATEMENT OF FEDERAL FUNDING

This invention was made with government support under Grant DE-FG02-86ER13622.A000 awarded by U.S. Department of Energy. The government has certain rights in the invention.

BACKGROUND

Field of the Disclosure

This disclosure relates to mesoporous materials and processes for making mesoporous materials, in particular, the synthesis of stable mesoporous materials which are efficient electrocatalysts. The mesoporous metal oxide is very active and stable (durability>11 h) for electrochemical hydrogen evolution reaction (HER) in both acidic and alkaline conditions. The mesoporous metal oxide serves as an HER electrocatalyst without the assistant of carbon materials, noble metals, or $MoS_2$ materials, which are widely used in previously developed HER systems.

Discussion of the Background Art

Porous materials consist of micropores (<2 nm), mesopores (2-50 nm), macropores (>50 nm) and sometimes combinations of these. Considerable interest in the control of pore sizes and pore size distributions of such materials has been a focus for quite some time. Nano-size materials can have markedly different properties than similar compositions that are bulk size (μm and above).

Such control comes from specific synthetic methods such as use of templates, structure directors, surfactants, core shell, self assembly, epitaxial growth, size reduction, capping agents, sol gel, and other methods. Morphologies can be controlled by compositions including dopants. The conditions during syntheses such as use of heat, humidity, light, pH, point of zero charge, stirring, high pressure, and others are also important.

Mesoporous materials with varied pore sizes and pore size distributions can be obtained for some systems such as silicon and titanium based oxide materials. Control of the structure of the material is also an issue. Many systems have both micropores and mesopores and pore interconnectivity is of interest with these materials. Enhanced mass transport for catalytic reactions might be realized by fine-tuning the porosity of such systems. Incorporation of biomolecules larger than the micropore regime also might be done using well ordered crystalline mesoporous materials.

Hydrogen has been intensively pursued as a future energy carrier due to its renewable and environmentally friendly properties compared to other fuels (coal, gasoline, methane, etc.). Particularly, growing attention has paid to sustainable hydrogen evolution reaction (HER) from the water splitting reaction, which is a clean and environmentally benign reaction pathway. Usually, HER in acidic media requires lower overpotential, which is more economically efficient compare to alkaline media. Alkaline media are still promising due to the possibility for driving the overall water splitting reaction by producing hydrogen at the cathode and oxygen at the anode simultaneously.

Pt and Pt based materials are known as the most efficient electrocatalysts for HER in both acidic and alkaline conditions. However, the scarcity and high cost of Pt do not allow widespread use as electrocatalysts for HER. The development of electrocatalysts that are Pt free, highly active and operable in both acidic and alkaline conditions remains a challenging task. In recent years, metal sulfides ($MoS_2$, $FeS_2$ et al.), carbon based (carbon nanotubes, graphitic carbon et al.) or hybrid materials (carbon supported metal oxide, reduced graphene oxide supported metal sulfides et al.) have been intensively studied as replacements for Pt based electrocatalysts. These materials have been reported that have high active HER activity and stability in acidic media or alkaline media. Nevertheless, electrocatalysts that could drive HER in both acidic and alkaline systems are rarely reported. More studies need to be done to understand the catalytic activity and the chemical stability under different conditions.

Molybdenum based materials (such as molybdenum carbonitride (MoCN), molybdenum diselenide ($MoSe_2$), bimetallic Ni—Mo—C materials) have been investigated as active HER electrocatalysts. Molybdenum disulfides ($MoS_2$) are Mo based materials that have been widely studied and have exhibited promising HER activity. In 2005, Hinnemann et al. first reported that the under-coordinated sulfur atoms at the edges of $MoS_2$ have very similar properties to natural HER active enzymatic centers. Since then, $MoS_2$ materials have been extensively investigated for HER. However, their catalytic HER activity is limited by the number of active sites.

Molybdenum oxide ($MoO_3$) is a low cost, nontoxic and environmentally benign transition metal with high stability. $MoO_3$ is widely employed in heterogeneous catalysis, electrocatalysis, and also in capacitors, lithium-ion battery applications. The orthorhombic α-$MoO_3$ (thermodynamically stable phase) has a layered structure which is formed by stacking bilayer sheets of $MoO_6$ octahedra with van der Waals forces. This structure is suitable for insertion/removal of small ions such as H+, and therefore is intensively studied as a supercapacitor. However, without active edges like those of $MoS_2$, it is unknown whether intrinsic $MoO_3$ material is useful as an electrocatalyst for HERA

SUMMARY

This disclosure relates, in part, to mesoporous metal oxides and processes of synthesizing the same to serve as active electrocatalysts in alkaline and acidic conditions, including in certain aspects, without any extrinsic dopants, alloys, or any hybrid metals. Experimental and theoretical (DFT calculation) results indicate that the soft-template synthesis of transition metal oxides with mesoporosity and oxygen deficiency provides a promising strategy for electrochemical energy conversion and storage applications.

In one aspect, the disclosure provides a process for preparing a mesoporous metal oxide with nano-sized crystalline walls, said process comprising:

providing a gel or a solution comprising a metal oxide in a fluid;

adding surfactant solution to the said metal oxide; and heating the mixture at a temperature and for a period of time sufficient to form the mesoporous material, wherein the mesoporous metal oxide is oxygen deficient and has an overpotential of from about 0.01 to about 0.20V.

In another aspect, the disclosure provides a process for preparing a mesoporous metal oxide, said process comprising:

providing a mixture comprising a metal precursor dissolved in a fluid, an interface modifier, a surfactant solution; and heating the mixture at a temperature and for a period of time sufficient to form the mesoporous metal oxide material, wherein the mesoporous metal oxide is an electrocatalyst.

In any of the aspects or embodiments described herein, the metal oxide is $MoO_3$. In certain embodiments, the $MoO_3$ is dissolved in $H_2O_2$. As described herein, the described processes result in a mesoporous metal oxide which is an efficient electrocatalyst. In other words, the catalyst requires a low over potential, e.g., from about 0.01 to about 0.20V and has small charge transfer resistance from about 20Ω to about 60Ω.

In yet another embodiment, the description provides a process for preparing a mesoporous metal oxide, wherein the surfactant solution is a soft template, PEO-b-PS in THF.

In certain embodiments, the description provides a process for preparing a mesoporous metal oxide, wherein the mesoporous metal oxide is $MoO_{3-x}$.

In any of the aspects or embodiments described herein, the mesoporous metal oxide acts as an electrocatalyst for Hydrogen Evolution Reaction (HER).

In certain embodiments, the description provides a process for preparing a mesoporous metal oxide, wherein the mesoporous metal oxide is efficient in charge transfer and conductivity.

In certain embodiments, the description provides a process for preparing a mesoporous metal oxide which requires a low overpotential of from about 0.01 to about 0.20V, or from about 0.06 to about 0.14

In certain embodiments, the description provides a process for preparing a mesoporous metal oxide, wherein the mesoporous metal oxide acts as an electrocatalyst in both acidic and alkaline solution.

In certain embodiments, the description provides a process for preparing a mesoporous metal oxide, wherein the mesoporous metal oxide has resistance from about 20Ω to about 60Ω or from about 30Ω to about 50Ω

In certain embodiments, the description provides a process for preparing a mesoporous metal oxide, wherein the mesoporous metal oxide is calcined at 350° C. or 450° C. under air.

In another aspect, the disclosure provides a highly efficient electrocatalyst mesoporous metal oxide material which is stable and active in both acidic and alkaline conditions. In certain embodiments, the mesoporous metal oxide is Molybdenum oxide. In a preferred embodiment, the Mo oxide serves as an HER electrocatalyst without the assistant of carbon materials, noble metals, or MoS2 materials. In certain embodiments, the mesoporous metal oxide material is MoO3-x.

In certain embodiments, the mesoporous metal oxide has nano-sized wall crystallinity, mesopore size of from about 5 nm to about 500 nm, a surface area of from about 5 m2/g to about 100 m2/g, a charge transfer resistance of from about 20Ω to about 60Ω, wherein the mesoporous metal oxide exhibits high catalytic activity as an efficient electrocatalyst.

In certain embodiments, the description provides a mesoporous metal oxide having nano-sized wall crystallinity, wherein the mesoporous metal oxide comprises mespore size of from about 20 nm to about 40 nm, a surface area of from about 40 m2/g to about 60 m2/g, a charge transfer resistance of from about 30Ω to about 50Ω, wherein the mesoporous metal oxide exhibits high catalytic activity for more than 11 hours in hydrogen evolution reaction (HER).

In certain embodiments, the mesoporous metal oxide electrocatalyst is active and stable in both acidic and alkaline solution.

In some embodiments, the mesoporous metal oxide serves as HER electrocatalyst without the assistant of carbon materials, noble metals, or another metal derivative materials.

In some embodiments, the the mesoporous metal oxide has mesopores of pore size of from about 2 nm to about 50 nm or more preferably from about 20 nm to about 40 nm, an over potential of from about 0.01 to about 0.20V and a charge transfer resistance of from about 20Ω to about 60Ω for efficient mass transport and charge transfer during electrochemical applications.

In some embodiments, the mesoporous metal oxide incorporated into at least one of a redox catalyst, a supercapacitor, a battery or combination thereof.

In some embodiments, the mesoporous metal oxide is mesoporous Molybdenum oxide wherein the mesoporous Molybdenum oxide has oxidation states of Mo5+ and Mo6+.

In an additional aspect, the description provides A method of producing a mesoporous metal oxide with high electrocatalytic activity, said method comprising: providing a gel or a solution comprising a metal oxide;

adding surfactant solution to the said metal oxide; and heating the mixture at a temperature and for a period of time sufficient to form the mesoporous material;

wherein the mesoporous metal oxide is oxygen deficient and has an overpotential of from about 0.01 to about 0.20V and a small charge transfer resistance of from about 20Ω to about 60Ω in both acidic and alkaline solution.

In certain embodiments, the description provides a method of producing a mesoporous metal oxide with high HER activity, said method comprising:

providing a gel or a solution comprising a metal oxide;

adding surfactant solution to the said metal oxide; and heating the mixture at a temperature and for a period of time sufficient to form the mesoporous material;

wherein the mesoporous metal oxide requires an overpotential from about 0.01 to about 0.20V and a small charge transfer resistance of from about 20Ω to about 60Ω in both acidic and alkaline solution.

In certain preffered embodiments, the description provides a method of producing a $MoO_{3-x}$ with high HER activity, said method comprising:

providing a gel or a solution comprising commercially available Molybdenum oxide;

adding surfactant solution to the said metal oxide; and heating the powder, solution or gel mixture at a temperature and for a period of time sufficient to form the mesoporous material;

wherein the mesoporous metal oxide is an electrocatalyst with an overpotential of from about 0.06 to about 0.14V and a small charge transfer resistance of about 30Ω to about 50Ω in both acidic and alkaline solution.

BRIEF DESCRIPTION OF THE DRAWINGS

FIGS. 17A, 17B, 17C, and 17D. SEM images of (17A), (17B) bare carbon cloth with different magnifications. (17C) The morphology of $mMoO_3$ sample deposited on C cloth before the stability test. (17D) The morphology of $mMoO_3$ sample deposited on C cloth after a 12 h stability test.

FIGS. 18A and 18B. Nyquist plots obtained from EIS measurements in (18A) 0.1 M KOH solution on the Ni foam electrode, and (18B) in 0.1 M H2SO4 solution on a carbon cloth electrode.

DETAILED DESCRIPTION

Example

Herein, is reported that mesoporous MoO3-x serves as an active HER electrocatalyst in alkaline and acidic conditions. Without any extrinsic dopants, alloys, or any hybrid metals. The HER activity of MoO3 has been developed and improved by considering the following aspects. First is the mesoporosity of MoO3, since the mesoporous structure was shown previously to effectively enhance the activity of various kinds of metal oxides (WO3, TiO2, Co3O4, etc.) in catalytic reactions. By using commercial molybdenum oxide as a cheap Mo precursor and the combination of soft template (PEO-b-PS), mesoporous MoO3 could be obtained in simple steps; Second is the design of non-stoichiometric structure MoO3-x with oxygen vacancies. The oxygen deficient structure has been manifested in other transition metal oxides (TiO2, WO3, ZnO, MnO2, etc.) that are able to facilitate charge transfer, mass transport, and narrowing bandgaps in various catalytic reactions. The potential effects of oxygen vacancies of transition metal oxides should be significant in HER system. Last is the phase of MoO3, the orthorhombic α-MoO3 (thermodynamically stable phase) has a layered structure which is suitable for insertion/removal of small ions such as H+ in electrochemical reactions. Above all, is reported a mesoporous MoO3-x material as a highly efficient HER catalyst in both acidic and alkaline conditions. The experimental and theoretical (DFT calculation) results indicate that the soft-template synthesis of transition metal oxides with mesoporosity and oxygen deficiency provides a promising strategy for electrochemical energy conversion and storage applications.

Results

Figure 1A:
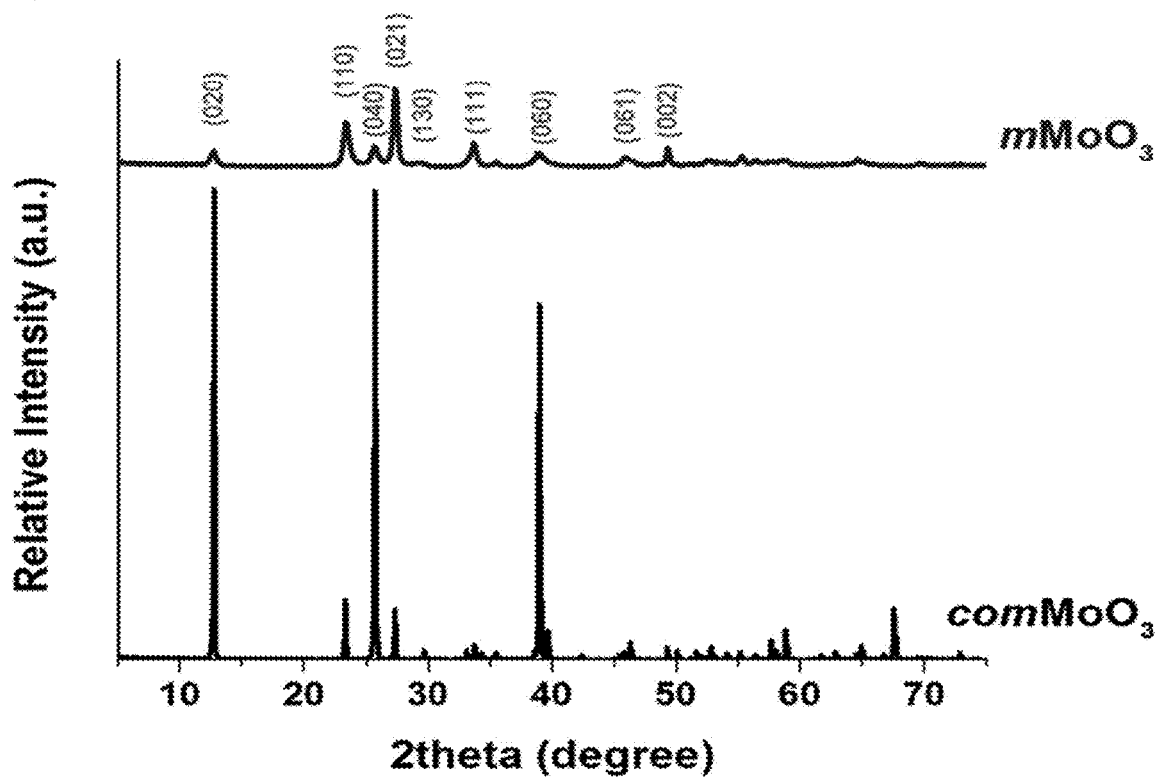
FIGS. 1A and 1B. (1A) PXRD patterns and (1B) Raman spectroscopy for comMoO3 (labeled) and mesoporous mMoO3 (labeled).
Figure 1B:
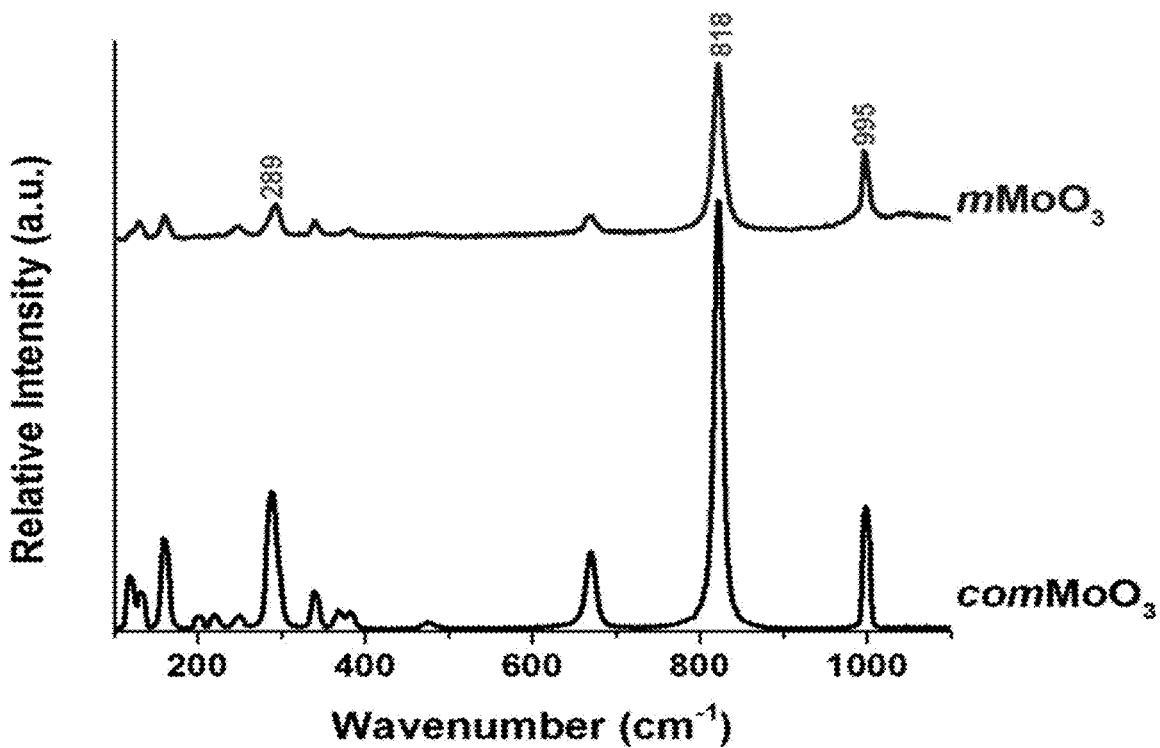

In order to study the crystal phase change during the synthesis of mesoporous MoO3 (mMoO3), powder X-ray diffraction (PXRD) and Raman spectroscopy were used. Shown in FIG. 1A, for the as-synthesized mMoO3, all the diffraction lines could be assigned to the orthorhombic phase (α-MoO3 phase, JCPDS No. 05-0508), which is crystallized in a layered structure composed of MoO6 octahedra by sharing edges and corners. The commercial MoO3 (comMoO3) sample also shows the orthorhombic phase (α-MoO3 phase, JCPDS No. 35-0609), but with different crystal parameters. No diffraction lines of other phases (β-MoO3, h-MoO3) were found in both samples. The mMoO3 shows much lower crystallinity than comMoO3, which may be due to the formation of a mesostructured that breaks the long-term crystallinity. Another observation is for synthesized mMoO3, the relative diffraction intensity between (040) and (021) planes is significantly different from comMoO3, which indicating a preferred crystal orientation along the [001] directon. The phase of molybdenum oxide samples can be further characterized by Raman spectroscopy, due to each phase occupying different atomic arrangements with different Raman vibrational bands. The three characteristic vibrational modes of the orthorhombic phase at 289, 818, and 995 cm−1 display in both samples. All observed vibrational modes are in agreement with the α-MoO3 phase reported in the literature. Based on PXRD and Raman results, even though the introduction of PEO-b-PS surfactant slightly decreased the crystallinity of MoO3, the thermodynamic stable orthorhombic phase (α-MoO3) was preserved during the formation of the mesostructure. The presence of mesopores could be further manifested by SEM, TEM, and N2 sorption techniques.

Figure 2A:
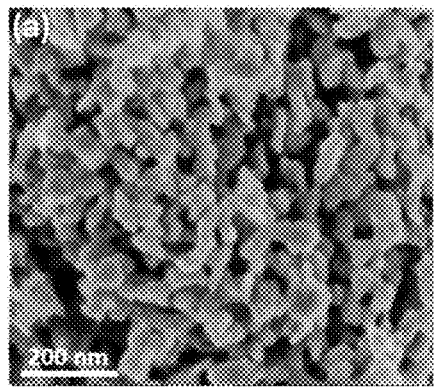
FIGS. 2A, 2B, 2C, 2D, 2E, and 2F. Scanning electron microscopy (SEM) images (2A-2C) for mesoporous mMoO3 sample with different magnifications. Porosity could be observed with different scales: (2A) 200 nm, (2B) 500 nm, and (2C) 5 µm. (2D) The SEM image of comMoO3 as a comparison. (2E) The transmission electron microscopy (TEM) image of mMoO3 with well dispersed mesopores (20-40 nm), a typical mesopore is illustrated in the onset image with a scale bar of 10 nm. (2F) High resolution TEM of mMoO3, the d-spacing (0.35 nm) of (040) plane of α-MoO3 is displayed.
Figure 2B:
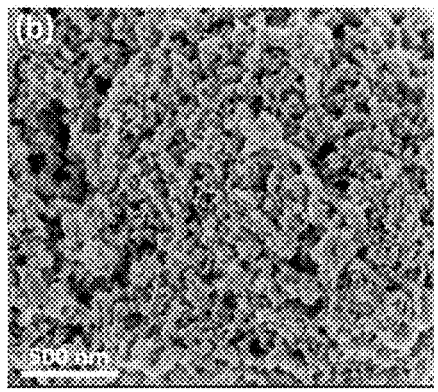
Figure 2C:
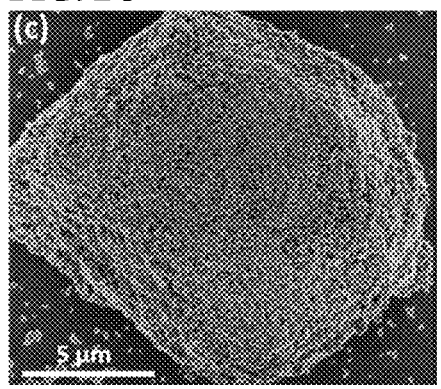
Figure 2D:
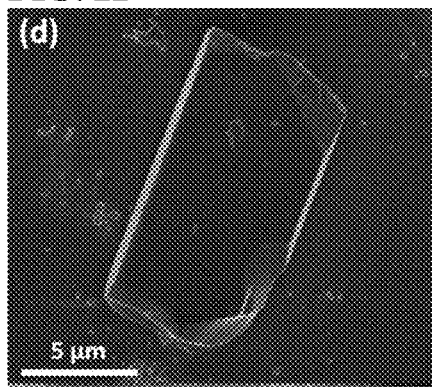

FIGS. 2A-2C shows field-emission scanning electron microscopy (FESEM) images for the mesoporous molybdenum (mMoO3) sample with various magnification scales. In terms of SEM results, the mMoO3 sample is composed of small particles, which have sizes smaller than 100 nm. The porosity was formed by the aggregation of nanoparticles, and the pores are the connected intraparticle voids. With lower magnification images (FIG. 2C), it is easier to observe the good dispersion of the pores. For comparison, the SEM image of comMoO3 sample was also recorded (FIG. 2D). The commercial sample is composed of giant chunk of crystal (5-10 μm) instead of nanoparticles. No porosity could be observed in this sample.

Figure 2E:
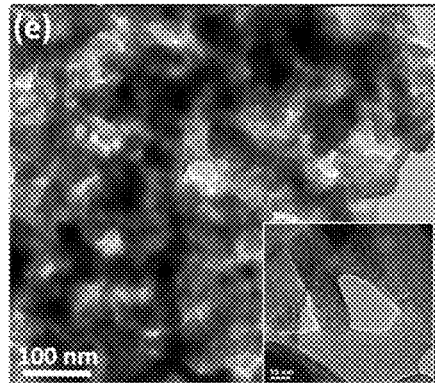
Figure 2F:
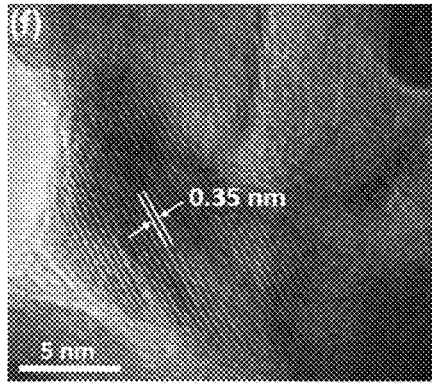
Figure 8A:
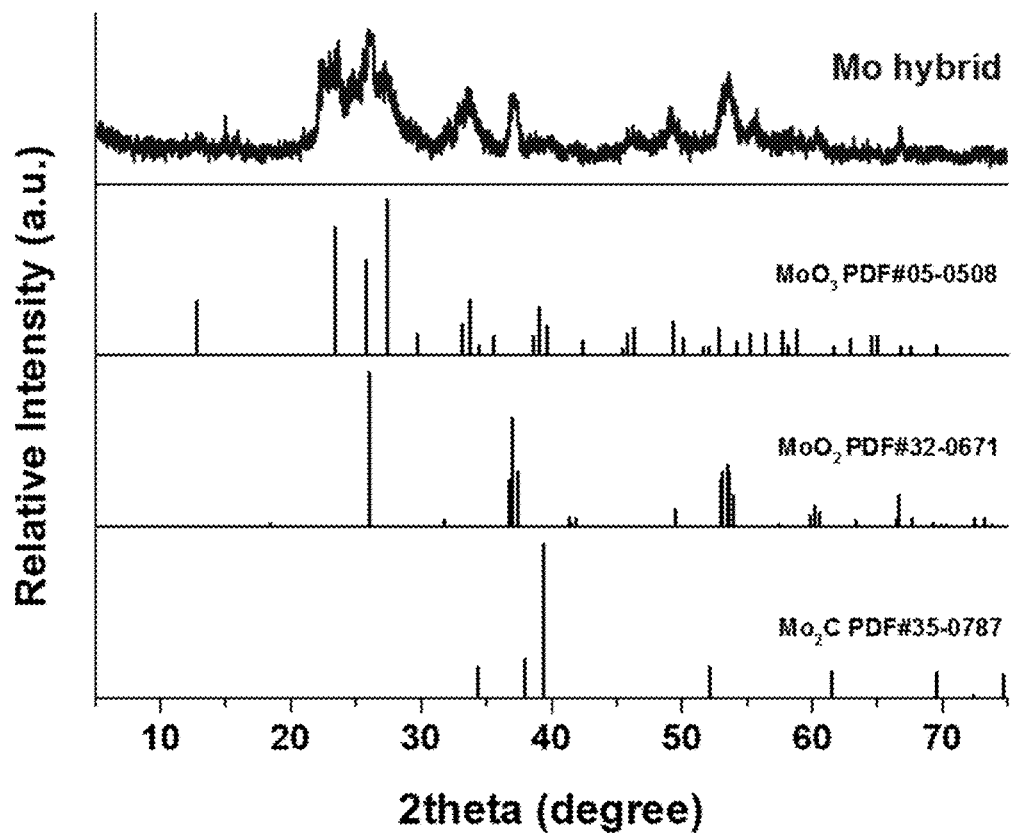
FIGS. 8A and 8B. (8A) PXRD pattern of as-prepared Mo hybrid sample. Compared to standard patterns of MoO3 and MoO2. (8B) Raman spectroscopy of Mo hybrid sample.
Figure 8B:
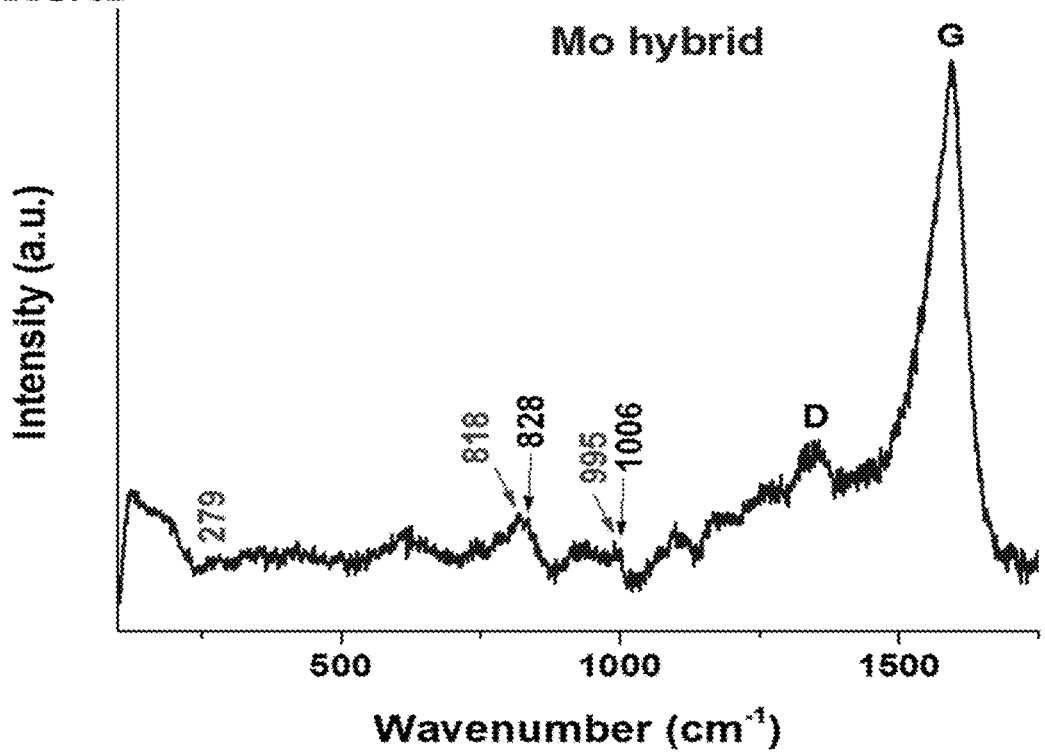

Transmission electron microscopy (TEM) was used to further examine particle size, morphology, porosity, and crystallinity. In a typical TEM image shown in FIG. 2E, the particle size of mMoO3 is in the range of 50-100 nm, in accordance with SEM results. The mMoO3 has a porous structure. Most of the pores are in the range of mesopores (20-40 nm). These mesopores are not of a uniform shape, but well dispersed between nanoparticles. In a higher magnification image (FIG. 2E, onset image), a typical mesopore connected with crystalline particles with a diameter around 30 nm is clearly observed. In FIG. 2F, the measured d-spacing (≈0.35 nm) corresponding to the (040) planes of the α-MoO3 phase, which is in accordance with XRD and Raman results. The specific pore size distribution was further confirmed by using N2 sorption techniques. FIG. 8A shows Nitrogen sorption isotherms of mMoO3 and comMoO3 materials. The isotherm of mMoO3 is categorized as Type IV, with a distinct hysteresis loop observed in the pressure range of 0.5-1 p/p0, indicating the mesoporosity of the material. While the isotherm of comMoO3 manifesting its nonporous property, without an obvious hysteresis loop. FIG. 8B shows the corresponding BJH pore size distribution of mMoO3, with an average pore diameter of 31 nm, good accord with SEM and TEM results. Moreover, the as-synthesized mMoO3 has a much larger surface area (52 m2/g) than comMoO3 (2 m2/g). With larger surface area, an improved catalytic activity of catalyst is expected.

Figure 3A:
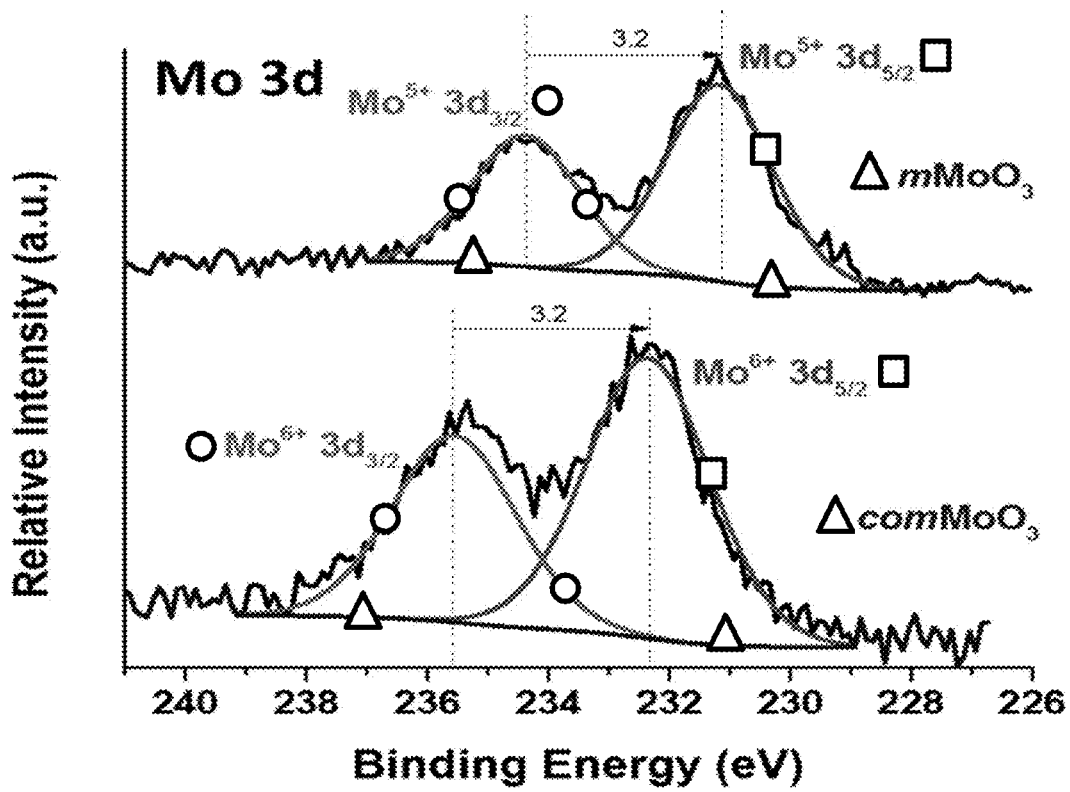
FIGS. 3A and 3B. XPS spectra details for (3A) Mo 3d binding energy regions, and (3B) O1s level. Lower and upper curves are comMoO3 and as-synthesized mMoO3, respectively.
Figure 3B:
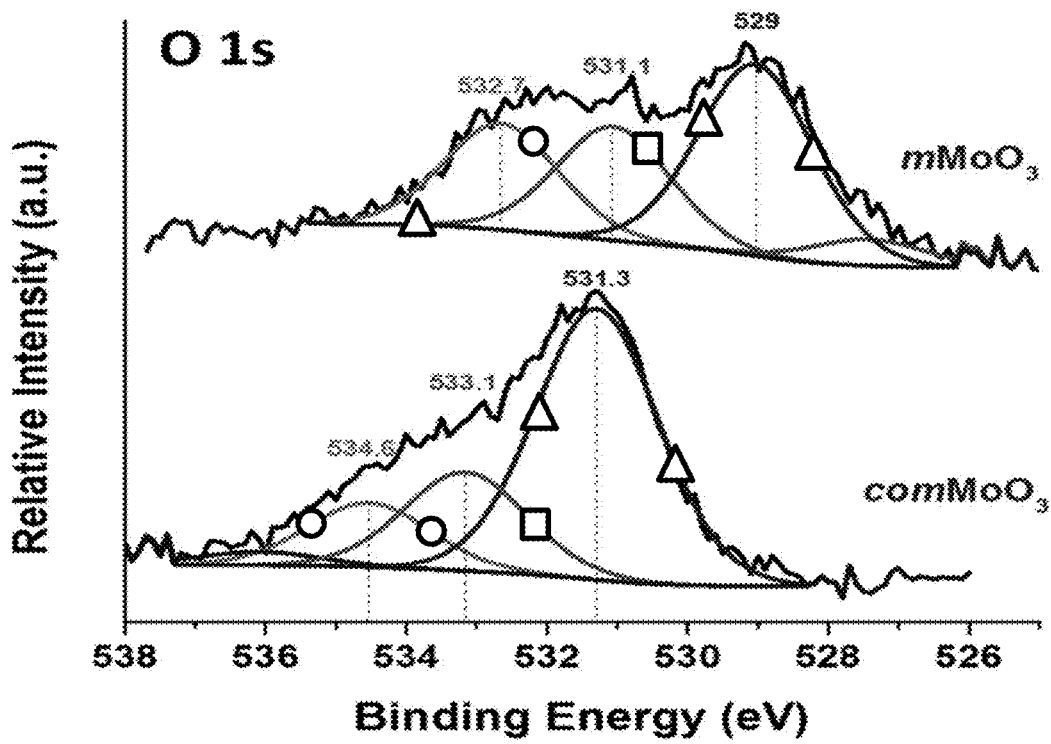
Figure 9:
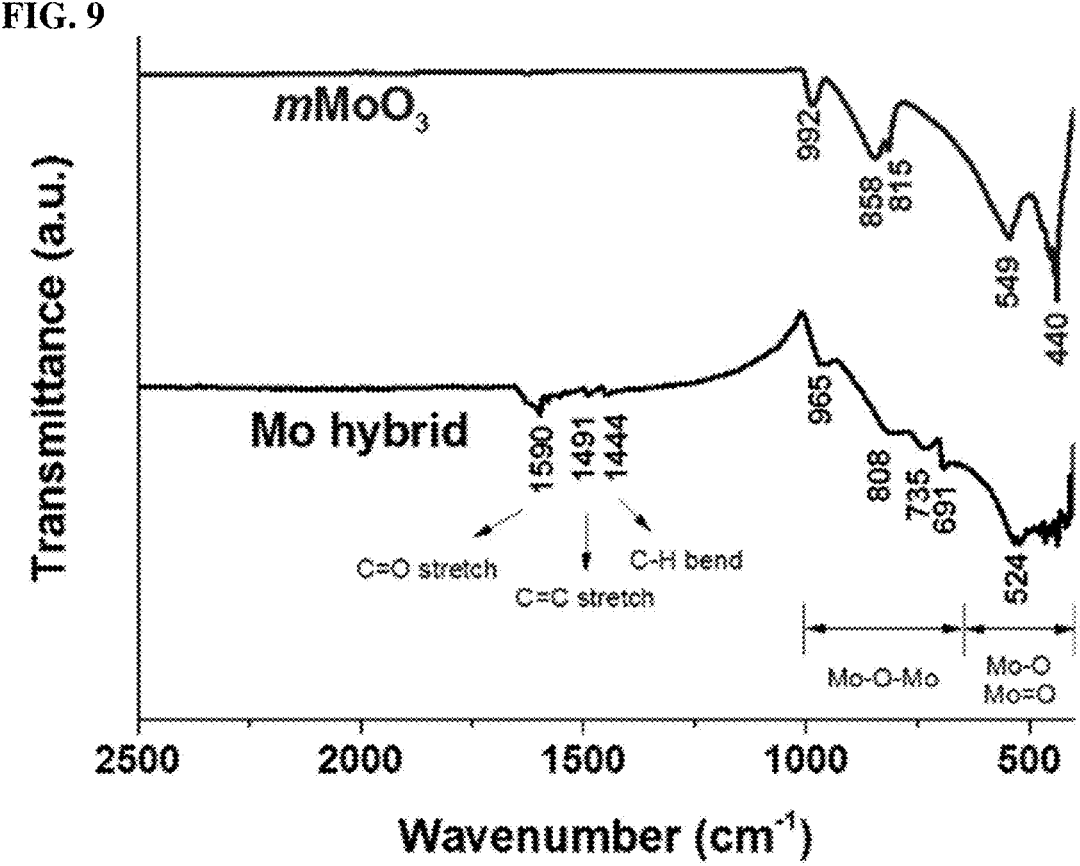
FIG. 9. FTIR spectra of as-prepared Mo hybrid sample (labeled) and mMoO3 sample (labeled).

Besides mesoporosity, the oxidation state of the metal and surface oxygen deficiencies are other important properties for transition metal oxides. To elucidate the oxidation state of the comMoO3 material and the mesoporous MoO3 material, X-ray photoelectron spectroscopy (XPS) measurements were applied. FIG. 3A exhibits the Mo 3d XPS core spectra of the as-prepared mMoO3 and comMoO3. The Mo 3d core level spectrum of the comMoO3 (lower curve) consists of a spin orbit doublet with peaks at 235.6 and 232.4 eV, which are attributed to 3d3/2 and 3d5/2 of the Mo cations in high oxidation states (Mo6+). Without the observation of other valence state, the comMoO3 possesses a fully stoichiometric structure according to PXRD and XPS results, which are consistent with previous reports.29 However, for the mMoO3 sample, an obvious shift to the lower binding energy can be observed. Without changing the energy difference (Δ=3.2 eV) between two peaks, Mo 3d3/2 shifted to 234.4 eV and Mo 3d5/2 shifted to 231.2 eV. Both of these two peaks can be assigned to Mo5+ species.30 The presence of Mo5+ cations leads to an increment in electron density and a weaker binding effect. FIG. 3B shows the O 1s spectra, for the comMoO3 material (lower curve), no obvious shift is observed, all peak positions are in good accord with literature values: the main component peak at 531.3 eV (triangle) corresponds to the lattice oxygen (O2-); 31 the other two component peaks (533.1 and 534.6 eV) are attributed to surface adsorbed species (OH—, O— et al.) .32,33 On the contrary, the major O 1s peak of mMoO3 shifted to a much lower level (529 eV), which indicates a change in the coordination configuration of Mo with O. As reported, the O 1s shifts to a lower energy level in line with the transfer of electrons to the neighboring oxygen vacancies.34 The presence of oxygen vacancies is suggested. Binding energy shifts to lower energy levels was also reported in other oxygen-deficient TMOs, such as the most widely studied material: TiO2-x.35 We could exclude the possibility of shifts coming from instrumental error, since the position of an internal standard (C 1s) peak is observed at 284.5 eV without any shifts (FIG. 9).

Figure 4A:
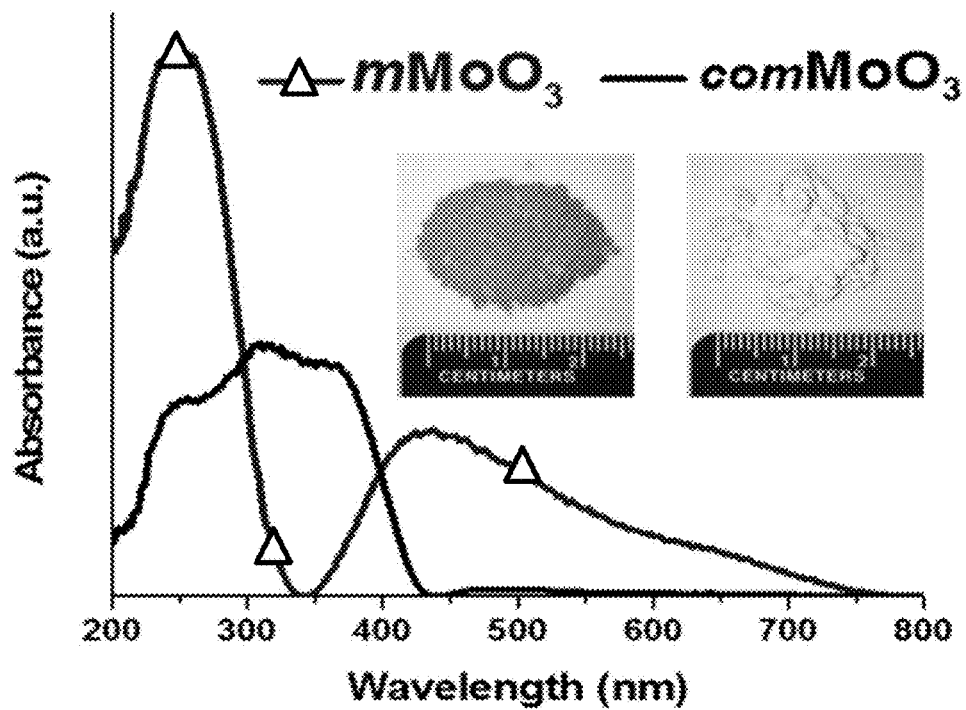
FIGS. 4A, 4B, 4C, and 4D. (4A) DR UV-vis spectra and photos (onset images) for comMoO3 and as-synthesized mMoO3. (4B) Oxygen temperature-programmed oxidation (TPO) for comMoO3 and mMoO3 samples. The onset images display the color change of samples after TPO treatment. (4C) Electronic band structure of orthorhombic MoO3 without (w/V) and with (V1, V2, and V3) vacancies at different sites. (4D) Optimized structure of MoO3 in which Mo and O atoms are shown. Numbers (1, 2, and 3) indicate three different positions of O which are considered for vacancies.

Another evidence that indicates the presence of oxygen vacancies is the color change (FIG. 4A onset images). The comMoO3 possesses a light greenish color, while the as-synthesized mMoO3 has a blue color. Similar to the case with oxygen-deficient WO3-x and TiO2-x, the blue color of the transition metal oxide originates from the characteristic outer d-shell electrons. In this disclosure, the as-synthesized blue molybdenum oxide species are quite stable in a sealed vial and could maintain their original color for at least 1 year. Moreover, it has been well documented that the optical properties of molybdenum oxides are strongly affected as a function of the oxygen vacancy concentration. Thus, diffuse reflectance ultraviolet-visible (DR UV-vis) spectra was applied. In FIG. 4A, the comMoO3 (black curve) shows a major absorption band in the UV range (<410 nm) and a cut-off wavelength at 420 nm, indicating an optical band gap around 2.96 eV (detailed calculation in supporting information). The mMoO3 shows a new and broad absorption band in the visible range (>410 nm), which means a much smaller band gap than comMoO3. Since there are no extrinsic dopants in the mMoO3 system, the narrowing of band gap could be ascribed to the presence of oxygen vacancies.

Figure 4B:
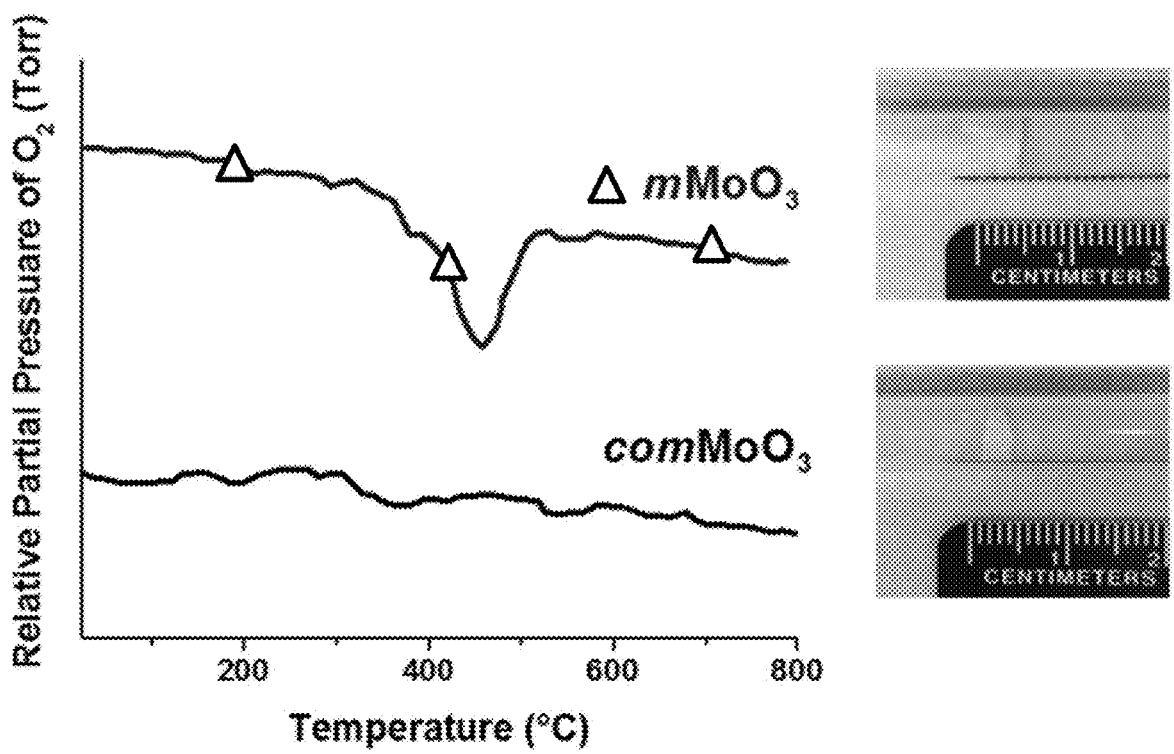

The existence of oxygen vacancies was further investigated by oxygen temperature-programmed oxidation (TPO). The O2 TPO profiles of mMoO3 and comMoO3 are compiled in FIG. 4B. The O2 TPO profile of comMoO3 (black curve) exhibits no obvious oxygen consumption peaks, indicating no oxygen vacancies on the surface of comMoO3. While the O2 TPO profile of mMoO3 shows a predominant oxygen consumption peak around 460° C., suggesting the existence of oxygen vacancies in the mMoO3 sample, which are able to react with flowing oxygen. Both samples after O2 TPO treatment were collected (onset images in FIG. 4B). A significant color change of mMoO3 could be observed. The mMoO3 lost its original blue color, due to oxygen vacancies that were filled by the oxygen flow. As a comparison, no color change can be noticed with the comMoO3 sample.

Figure 4C:
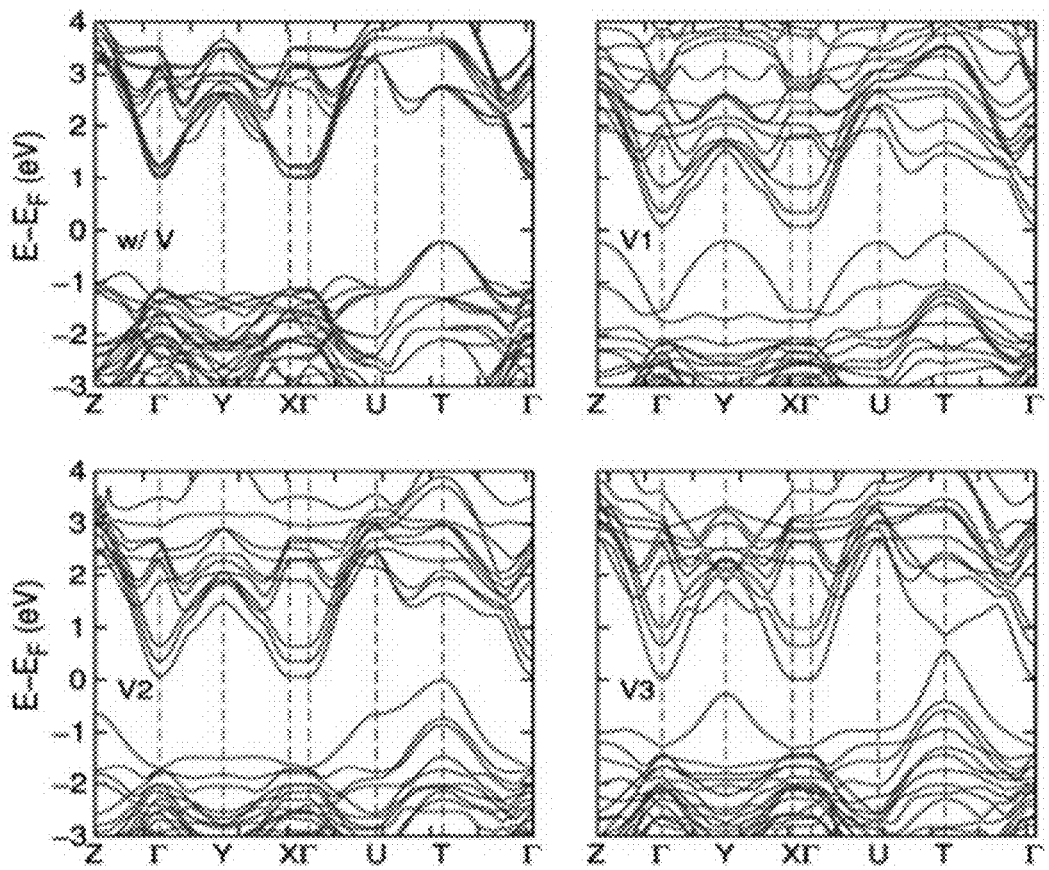
Figure 4D:
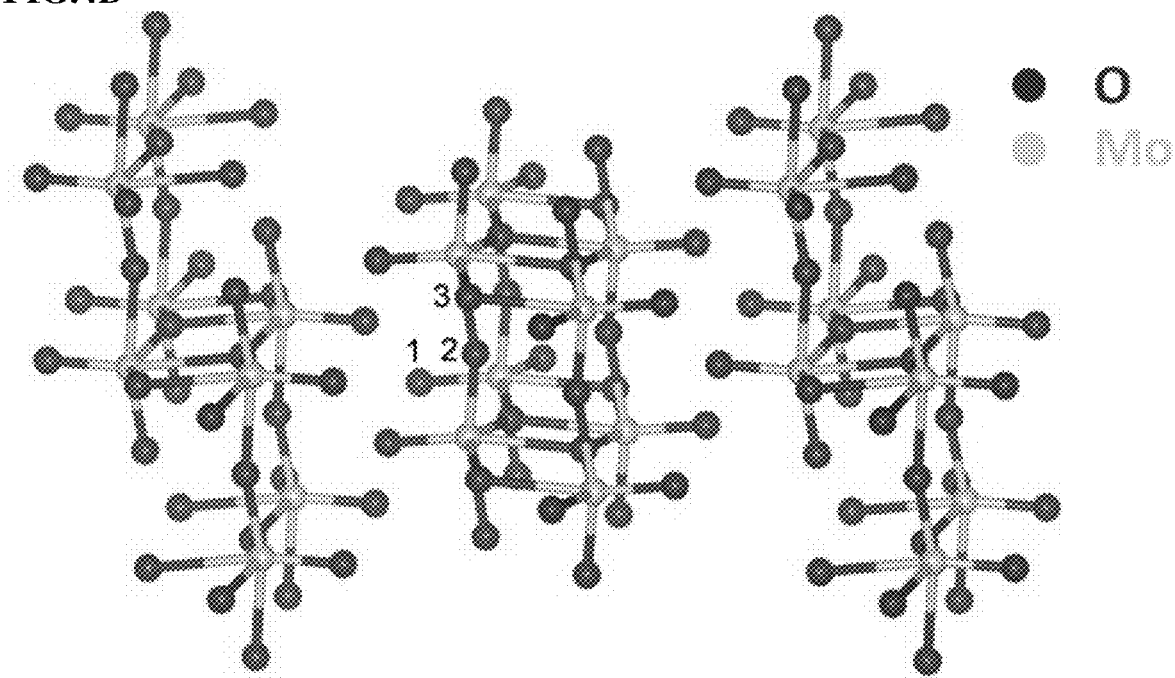

With further studies, DFT calculations were applied to analyze the band structure of MoO3 with and without oxygen vacancies. FIG. 4C shows that with oxygen vacancies in different sites (V1, V2, and V3), a much smaller band gap could be obtained compared to MoO3 without any oxygen vacancies (detailed calculations in Supporting Information). The smaller band gap observation is in agreement with the results from DR UV-vis spectroscopy. The α-MoO3 has a layered structure with three different sites of oxygen that can form vacancies, as shown in FIG. 4D. A vacancy at site 1 is most thermodynamically stable. We then considered the effects of oxygen vacancies at site 1 (detailed calculations in supporting information).

Figure 5A:
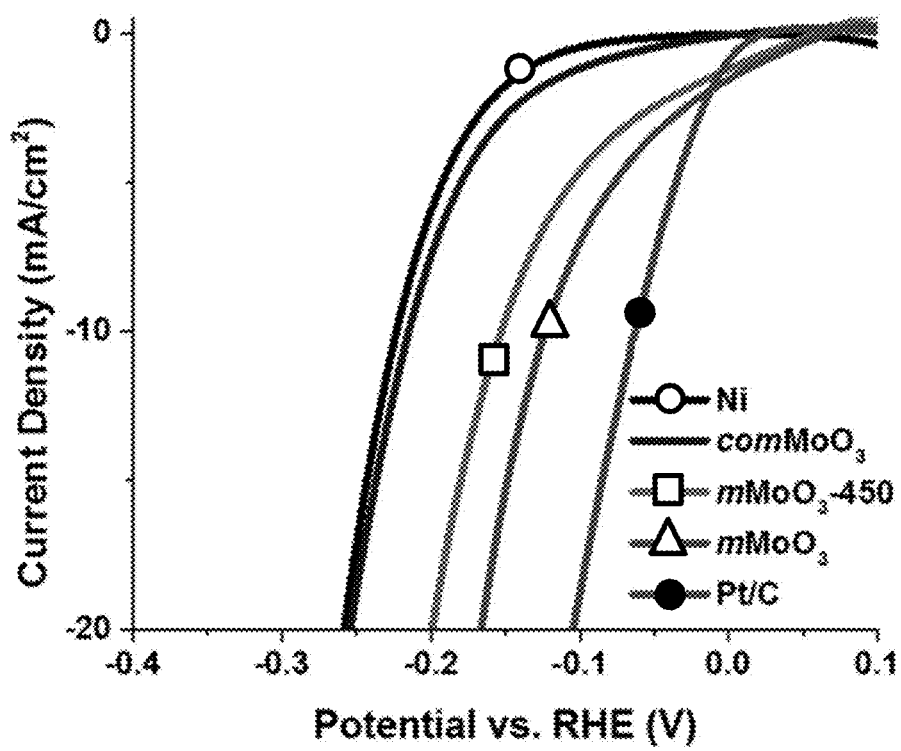
FIGS. 5A, 5B, 5C, and 5D. (5A) Polarization curves of mMoO3 materials on Ni foam electrode in 0.1 M KOH, along with bare Ni foam, comMoO3 and Pt/C for comparison. (5B) Time dependence of current density during HER over 11 h at fixed overpotential −0.174 V for mMoO3 sample in 0.1 M KOH. Onset image: photo was taken during HER using mMoO3 sample, H2 bubbles can be clearly observed on the electrode surface. (5C) Polarization curves of all materials on Ni foam electrode in 0.1 M H2SO4. (5D) Polarization curves of mMoO3 materials on carbon foam electrode in 0.1 M KOH, along with bare carbon foam and comMoO3 for comparison.

The electrocatalytic activities of the as-synthesized mMoO3 materials were examined in both alkaline (0.1 M KOH) and acidic aqueous (0.1 M H2SO4) solutions. All materials were deposited onto 3D nickel foam, which acts as a large surface area working electrode. For comparison, bare Ni foam, comMoO3, and commercial 20 wt % Pt/C were also studied under identical conditions. FIG. 5A shows the HER polarization curves of various electrocatalyts in 0.1 M KOH solution. Bare Ni foam (black curve) requires a large overpotential (~225 mV) to achieve a 10 mA/cm2 HER current density. The comMoO3, which was loaded on Ni foam, performed similarly as bare Ni foam (red curve). No improvement can be observed for the HER activity. As an extended study, the mMoO₃ material calcined at higher temperature (450° C., labeled as mMoO3-450) was also tested by HER, in order to have a rough idea about whether the calcination temperature affects catalytic properties. For mMoO3 and mMoO3-450 samples, the current densities reach 10 mA/cm2 at potentials of 122 mV and 153 mV, respectively. These overpotential values are much closer to the Pt/C catalyst system ($\eta$=65 mV for j=−10 mV/cm2) as compared to bare Ni or commercial sample tested under identical conditions, indicating excellent catalytic activity in mesoporous samples, especially for the mMoO3 sample.

Figure 5B:
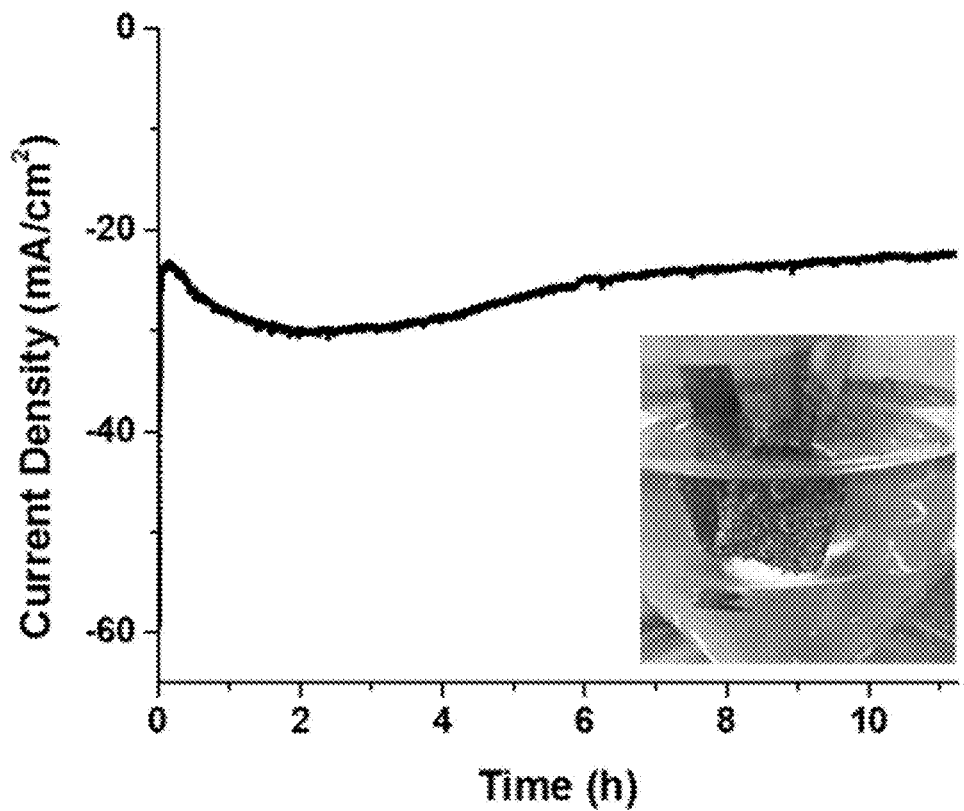

Besides activity, stability is another major concern for all electrocatalysts. The electrochemical stability of mMoO3 was evaluated by monitoring the current density during continuous operation at −0.174 V (vs. RHE) under alkaline conditions. The current density versus time data provided in FIG. 5B show that the value remains stable after a slight initial increase in the beginning several hours. The current density does not vary significantly in 11 h, manifesting excellent stability of mesoporous MoO3 during the electrochemical experiments. Hydrogen evolution can be directly observed in the onset image of FIG. 5B.

Figure 5C:
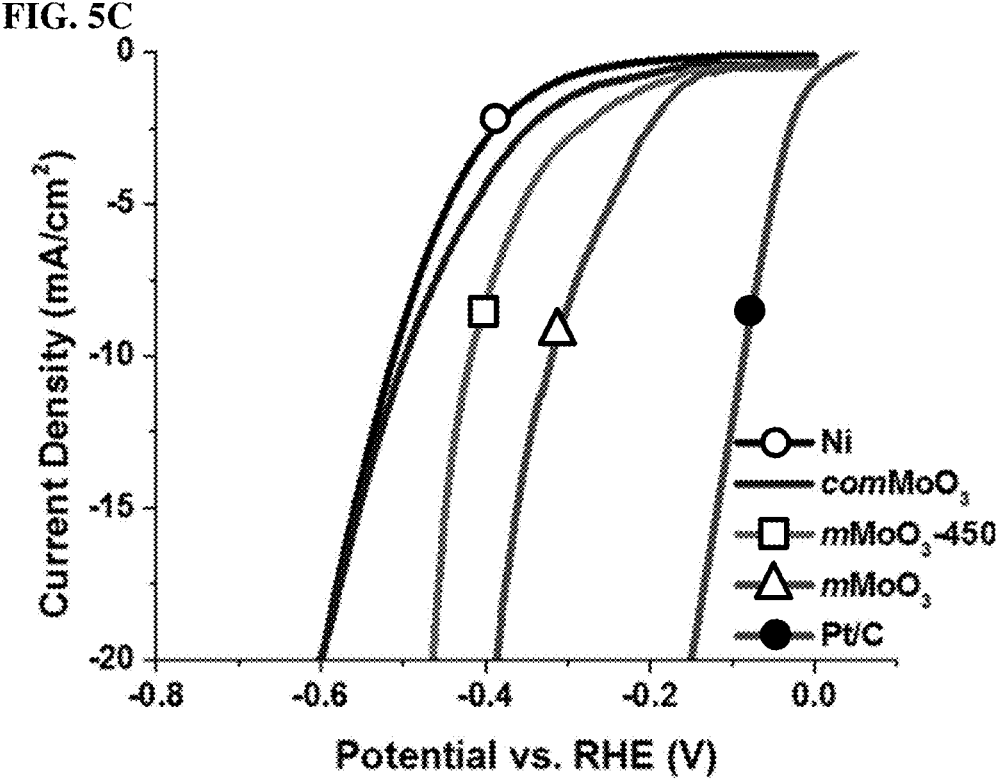
Figure 10A:
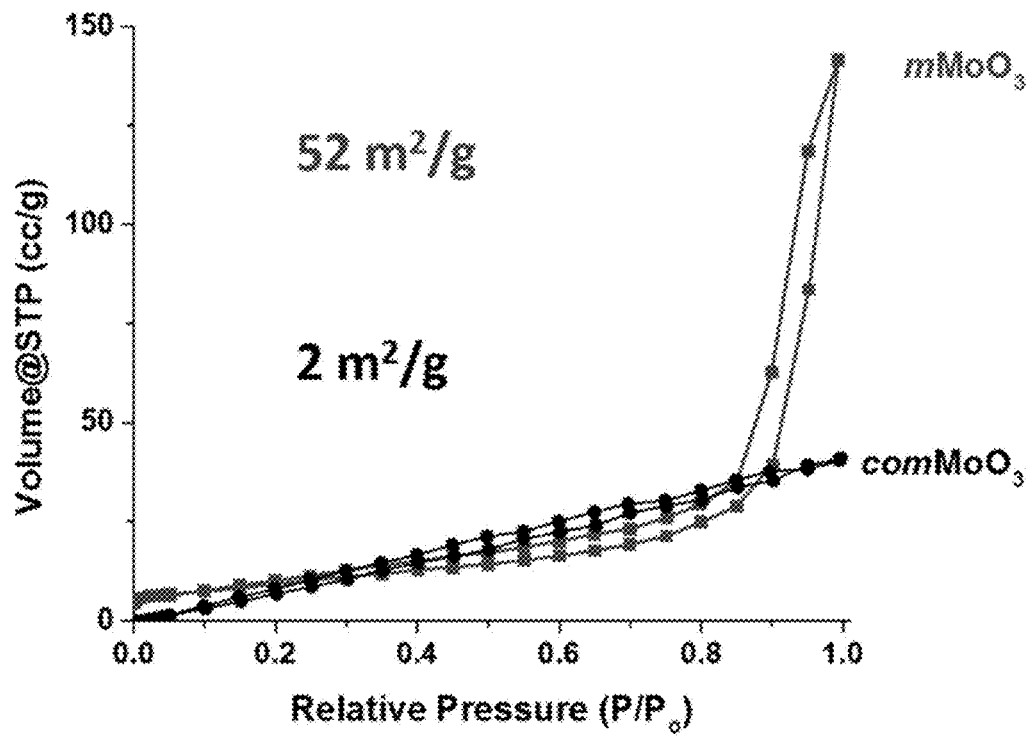
FIGS. 10A and 10B. (10A) $N_2$ sorption isotherms for mMoO3 and commercial $MoO_3$. (10B) BJH pore size distribution of mMoO3.
Figure 10B:
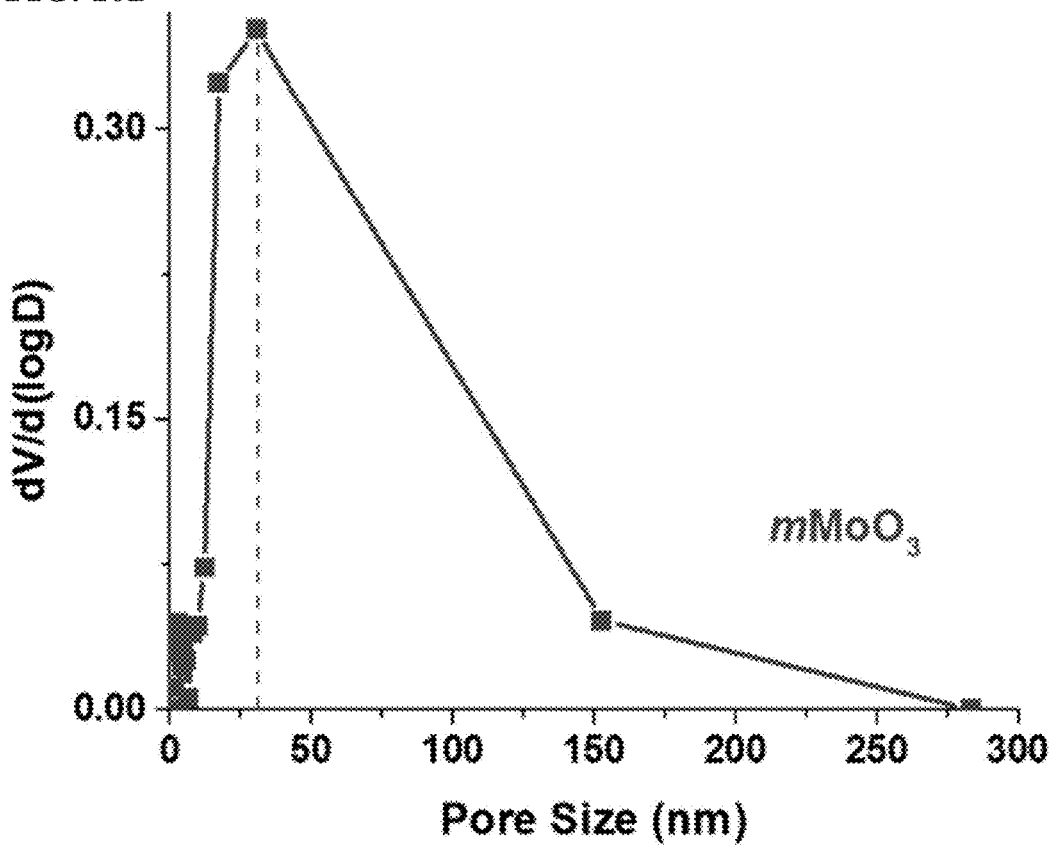
Figure 11:
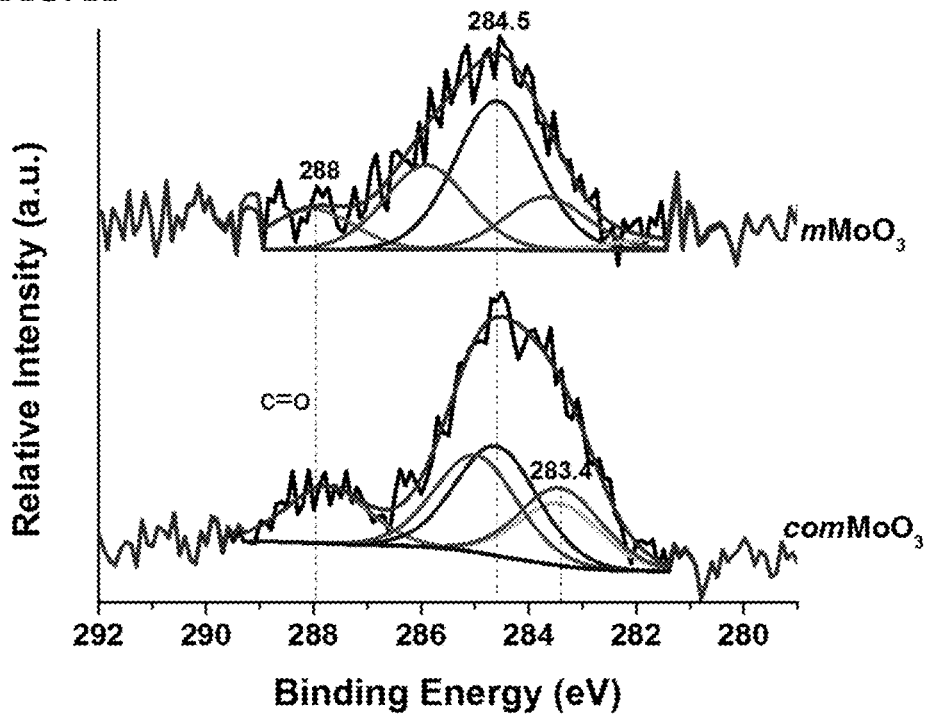
FIG. 11. X-ray photoelectron spectroscopy for C is as the internal standard.
Figure 12A:
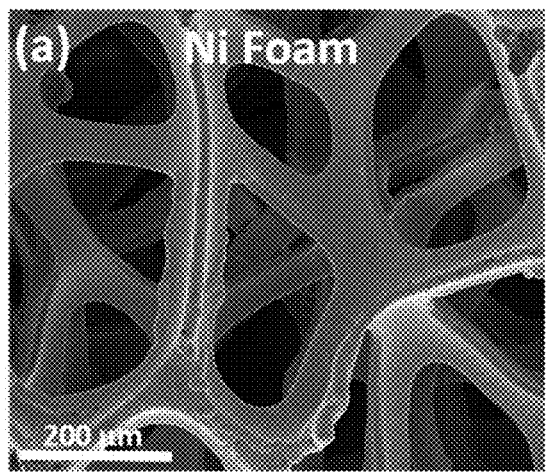
FIGS. 12A, 12B, and 12C. SEM images of (a) bare Ni foam. (b)(c) The morphology of mMoO3 sample deposited on Ni foam before and after the stability test, respectively.
Figure 12B:
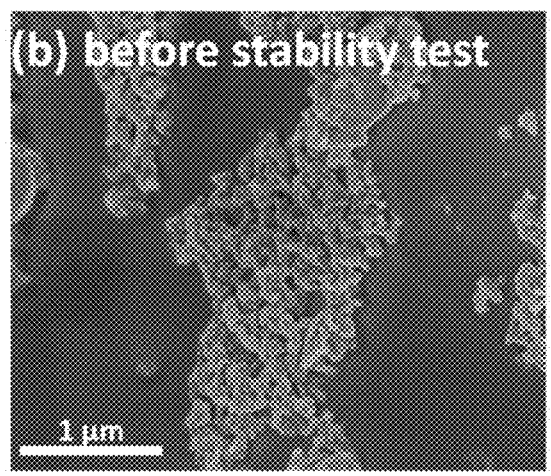
Figure 12C:
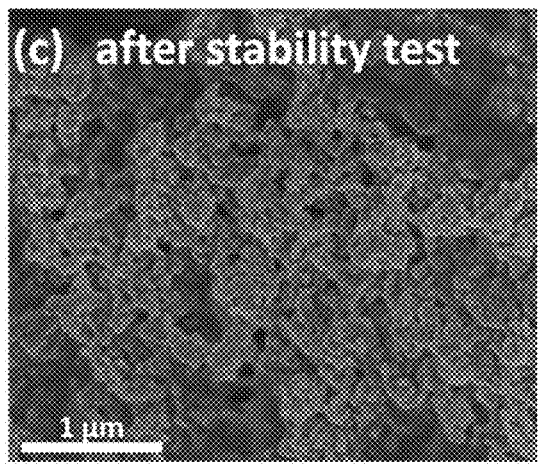

Due to the reported poor corrosion stability of Mo materials in acidic media, few studies in acidic media were reported. The HER activity of all prepared catalysts was further tested under acidic condition (0.1 M H2SO4). Shown in FIG. 5C, similar to alkaline conditions (0.1 M KOH), bare Ni foam exhibits the lowest activity ($\eta$=510 mV for j=−10 mV/cm2). With the deposition of comMoO3 on Ni foam, no enhanced HER activity can be observed. However, to achieve −10 mV/cm2 current density, mMoO3-450 needs a much lower overpotential of 154 mV. Additionally, mMoO3 sample shows even higher activity, requires an overpotential of 124 mV, which is close to the best HER electrocatalyst Pt/C (~63 mV) under identical conditions. In FIGS. 10A and 10B, the stability of mMoO3 was further investigated under acidic condition (0.1 M H2SO4). No obvious current density changes can be observed even after 12 h, which proves the excellent electrochemical stability of mesoporous MoO3 in acidic media.

Figure 5D:
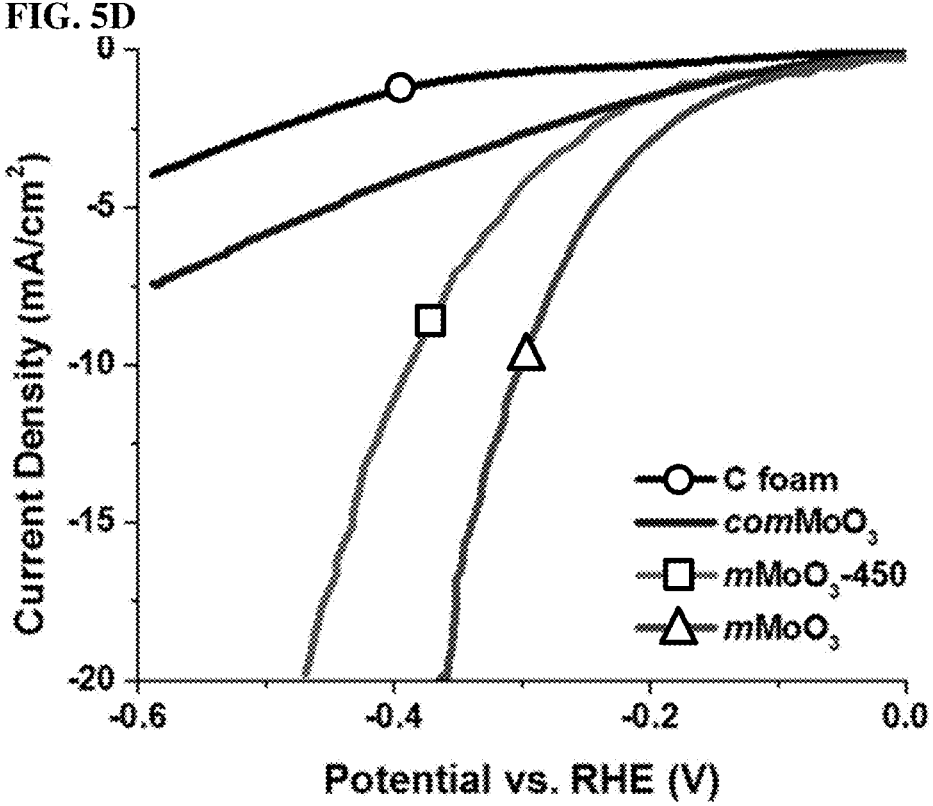

To further confirm the HER performance of mMoO3 material, one more concern is that Ni foam used as a working electrode may also contribute to HER activity. The 3D Ni foam has a high surface are, which is an ideal support to host catalysts for increasing the number of reaction sites. This foam is low cost and conductive metal which qualifies as a working electrode.40 The HER activity of Ni foam itself is comparable to some traditional metallic catalysts, due to the low resistance of Ni and large surface area of the foam. There are several studies that report nickel and nickel-molybdenum electrocatalysts for hydrogen evolution. In order to investigate if there is a synergistic effect between Ni and Mo, different working electrodes (carbon foams) were studied. The comMoO3 and mesoporous MoO3 samples were deposited on carbon foam (C foam) with the same amounts (0.2 mg/cm2) as on Ni foam. FIG. 5D shows the HER activity results in 0.1 M KOH media, with carbon foam applied as a working electrode. As-prepared mMoO3 samples (mMoO3, mMoO3-450) exhibit much higher HER activity than bare C foam or the comMoO3 sample. Overpotentials of 0.35 and 0.38 V can lead to current densities of 20 mA/cm2 for mMoO3 and mMoO3-450, respectively. For comparison, the bare C foam without any catalyst deposition under identical experimental conditions exhibits very low HER catalytic activity. With the deposition of comMoO3 sample on C foam, no significant improvement of HER catalytic activity can be observed. Above all, without the support of Ni foam, mMoO3 still shows much higher activity than comMoO3, indicating the Ni foam is not a key factor for the high HER activity in this study.

Discussion

The material structure possesses a vital role for its catalytic application. To understand the relation between structure and catalytic activity, the formation of mesoporosity and oxygen-deficient structure need to be discussed.

The formation of mesoporous structure and the crystal growth process. The formation of mesoporosity is illustrated schematically in Scheme 1. Unlike traditional preparation methods of mesoporous materials, the metal precursor used in this study is relatively cheap and abundant commercial molybdenum trioxide (molybdite). Firstly, comMoO3 powder is added to H2O2 solution. The MoO3 powder can be completely dissolved and results in a transparent yellow solution, with the formation of the solution-soluble precursor compound MoO2(OH)(OOH).29 By further combining with the soft template (PEO-b-PS), the preparation process is flexible, effective, and easy to control. Tetrahydrofuran (THF) is chosen as a solvent due to the ability to dissolve non-Pluronic copolymers such as PEO-b-PS. Both PS and PEO blocks can be completely dissolved without self-assembly aggregation (Scheme 1, step 1). Water is a selectively poor solvent for the PS block. With the mixing of water based Mo precursor and THF dissolved PEO-b-PS, inverse micelles with PEO cores and PS coronas are formed in solution (step 2). The coordination interaction between hydrophilic PEO and the Mo source thus triggers the self-assembly to form ordered polymer-oxide hybrids. After solvent evaporation (condensation process), two neighboring micelles fuse together and permanent Mo—O covalent bonds can be formed between PEO domains (step 3). The organic block polymer can be burned off by following thermal calcination. With the increasing of calcination temperature, the Mo crystals grow and expand to form connected intraparticle voids, which are mesopores (Step 4). Note that 350° C. is the critical temperature for phase transition of MoO3. For MoO3 samples calcined less than 350° C., monoclinic β-MoO3 is the dominant phase. Crystallization to more thermodynamically stable orthorhombic α-MoO3 occurs at 350° C. and above.45 In terms of PXRD and Raman spectroscopy results, the mMoO3 material shows an orthorhombic structure. After finishing the above five steps, the mMoO3 material can be obtained.

The presence of oxygen vacancies and deficient MoO3-x structure. During the formation of mesoporous MoO3, an oxygen-deficient structure of mMoO3 material was also achieved. The chemical formula of as-synthesized mesoporous MoO3 materials could be identified as MoO3-x, due to the presence of oxygen vacancies and the reduced Mo5+ species. The non-stoichiometric structure of mMoO3-x was indicated by XPS (FIGS. 3A and 3B). XPS is regarded as a surface analysis technique, with an analysis depth no more than 10 nm. The Mo5+ species observed in the mMoO3 sample is considered mostly present on the surface (<10 nm). Shown in FIG. 3A, comMoO3 exhibits an oxidation state of Mo6+, while mMoO3 shows an oxidation state of Mo5+. The O 1s peak of mMoO3 shifted to lower binding energy level further supporting the change in the Mo—O bonds. The formation of Mo(V) in mMoO3 sample may be due to the reducing ability of PEO group in the PEO-b-PS template, which was previously reported in other studies.48 When Mo(VI) precursor are bound to the oxyethylene groups of PEO chains during the coordination interaction, there is reduction to form Mo-PEO complexes and assembly of inverse micelles through the THF evaporation (condensation) process. Charge neutrality was then maintained by the presence of oxygen vacancies. More evidence was collected from DR UV-vis (FIG. 4A), and O2 TPO (FIG. 4B) characterization methods, which are discussed above. The significant color change of mMoO3 before and after O2 TPO treatment indicates the original presence of oxygen vacancies and subsequent filled vacancies after TPO.

The decisive role of structure. The decisive role of material structure for the HER activities has been reported in the literature. For example, a recent study of nanoporous MoS2 synthesized by Kibsgaard et al. exhibited high HER activities due to a higher density of active surface sites. However, the activity decreased at high currents due to the produced H2 bubbles blocking the active sites inside the small porous network. In this study, the design of large accessible pores (20-40 nm) of mMoO3 is expected to improve HER activity without active sites being blocked.

The mesoporous structure of mMoO3 material possesses a decisive role for improving the charge transfer rate and conductivity. Due to their pore shape, large pore size, high surface area, and high electrical conductivity, mesoporous metal oxides have shown superior performances for electrochemical applications. The mesopores, which make it easy to effectively transport guest molecules/ions to the active sites located in internal particle, significantly enhance the charge transfer process during electrochemical reactions. In this study, in both alkaline and acidic medias, the mesostructure contributes to the HER activity in two aspects. First of all, the mesopores with high surface area provide more active sites for HER. N2 sorption measurements were applied to study the surface area of comMoO3 and mMoO3 materials. In supporting information (FIGS. 8A and 8B), mMoO3 (52 m2/g) possesses a much higher surface area than comMoO3 (2 m2/g) by Brunauer-Emmett-Teller (BET) measurements. Generally, higher surface area comes with more active sites; Second, mesopores facilitate the mass transport of fluids and the contact of reactant molecules/ions with active sites. In comMoO3 system, without a porous structure, electrolyte is only able to contact the surface of the bulk material, leading to the possible accumulation of electrons/ions/molecules on the surface and further decreases the reaction efficiency. In contrast, in the mMoO3 system, mesopores act as open access to introduce fluids to contact with the internal structure, which effectively improves the mass transport without blocking active sites. Thus, the conductivity should be effectively promoted by the mesostructure.

Figure 6A:
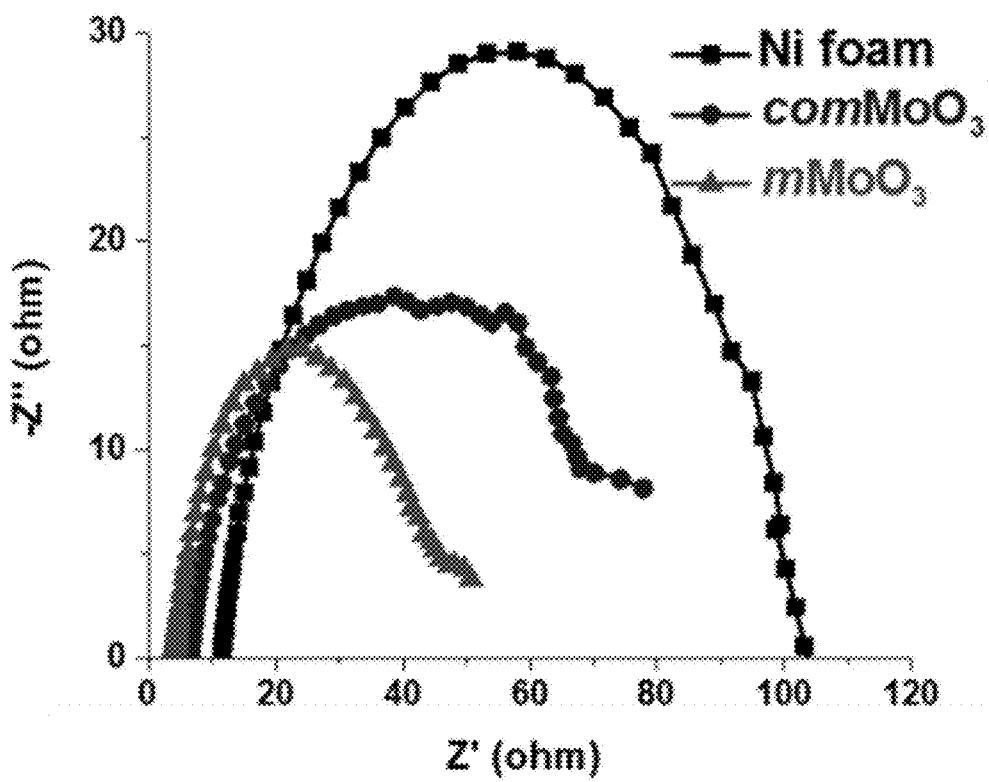
FIGS. 6A, 6B, and 6C. (6A) Nyquist plots obtained from EIS measure-ments in 0.1 M KOH solution on the Ni foam electrode at an anodic polarization potential of (−0.09V vs RHE). (6B) Corresponding Tafel plots of mMoO3 samples in 0.1 M KOH, along with bare Ni foam, comMoO3 and Pt/C for comparison. (6C) Proposed reaction pathway and the energy barrier profiles of mMoO3 sample.
Figure 13:
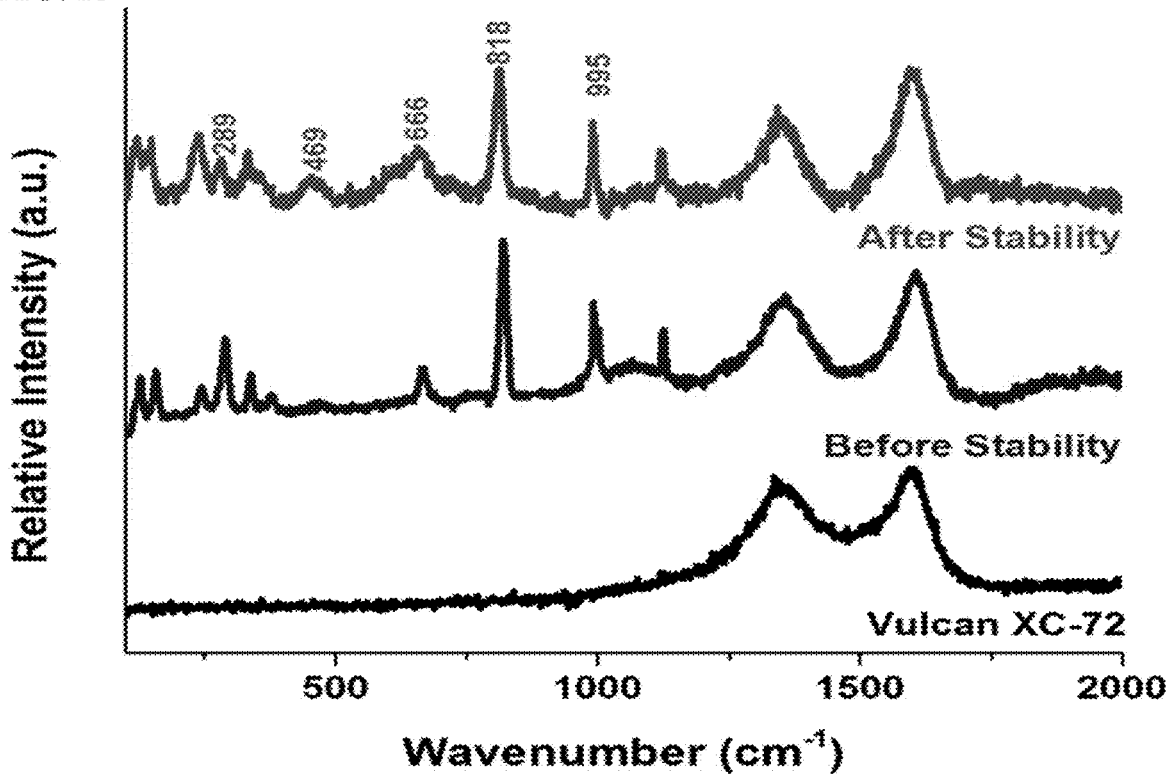
FIG. 13. Raman spectroscopy for mMoO3 sample (physically mixed with carbon black) before and after stability test in 0.1 M KOH. Bare carbon black (Vulcan XC-72) as comparison.

In order to prove the mesostructure is able to improve conductivity, we further conducted electrochemical impedance studies under HER reaction conditions by using Electrochemical Impedance Spectroscopy (EIS), shown in FIG. 6A with the equivalent circuit also plotted (FIG. 13). The high-frequency intersection with the x-axis represents the uncompensated solution resistance (Rs, ohmic resistance), which is comparable for all catalysts (Table 1). The apparent lower Faradaic resistance in the electrochemical impedance spectrum, is related to a higher charge-transfer rate in HER. The EIS spectra for the bare Ni foam and the comMoO3 exhibit high charge transfer resistance values (Rct=90 and 66Ω, respectively). The Rct of mMoO3 is 43Ω in 0.1 M KOH, indicating a better conductivity and an enhanced electrocatalytic performance. The Rct values follows the order mMoO3<comMoO3<bare Ni foam, in correlation with an inverse HER activity, suggesting the charge transfer process is a vital factor in this HER study. Mesopores significantly facilitate the charge transfer.

Another property that may affect the HER activity is the oxygen-deficient structure. Structural defects are always considered as active sites in catalytic reactions. Similar in HER, defects such as oxygen vacancies were regarded as active sites. The presence of oxygen vacancies enhances the interaction between oxygen-containing species and metal oxide surfaces. In this study, oxygen vacancies may favor the adsorption of water molecules (or H3O+), which serve as electron acceptors, then lower the HER energy barrier. In terms of DFT calculations (FIG. 4C), the introduction of oxygen vacancies in MoO3 gives rise to electrical conductivity. By reducing the metal cations, MoO3 can be made to be semi-metallic due to filling of the d-band.

Proposed HER mechanism. There are different mechanisms for HER in different conditions. The direct difference between alkaline and acidic mechanisms is the nature of the proton source [H2O or H3O+(see equations below)].

The HER in an alkaline media:

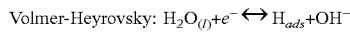

Volmer-Heyrovsky: $H_2O_{(l)} + e^- \leftrightarrow H_{ads} + OH^-$

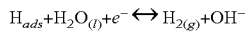

$H_{ads} + H_2O_{(l)} + e^- \leftrightarrow H_{2(g)} + OH^-$

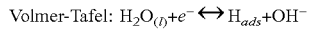

Volmer-Tafel: $H_2O_{(l)} + e^- \leftrightarrow H_{ads} + OH^-$

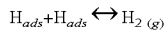

$H_{ads} + H_{ads} \leftrightarrow H_{2\ (g)}$

After hydrogen atoms adsorbed on the surface of the catalyst, subsequent production of H2 may occur via two different pathway s. Either via the Volmer-Heyrovsky mechanism (ion+atom reaction), the adsorbed hydrogen atom (Hads) accepts an electron and then combines with another proton source (H2O or H3O+) to release H2; or via the direct combination of two Hads, which is called the Volmer-Tafel mechanism (combination reaction).

Figure 6B:
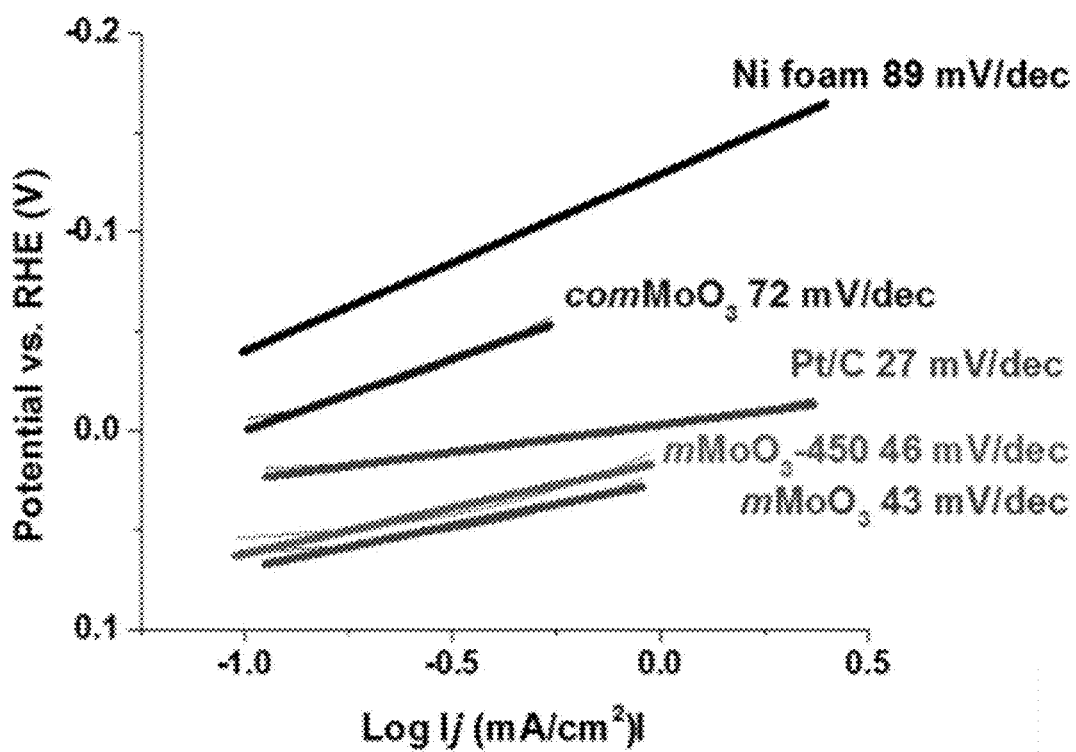

To determine the predominant HER mechanism, the Tafel slope is a useful indicator by suggesting the additional voltage needed to increase the current density by 10-fold. Generally, the smaller the value, the faster the HER rate. In FIG. 6B, under alkaline conditions, the measured Tafel slope of Pt/C is 27 mV/dec, indicating a fast Volmer-Tafel process. For mMoO3 and mMoO3-450 samples, Tafel slopes of 43 and 46 mV/dec are observed, suggesting a fast HER rate via the Volmer-Heyrovsky process. With Tafel slope close (or larger) to 116 mV/dec, the HER rate can be defined as a slow discharge reaction via the Volmer-Heyrovsky process, such as for Tafel slopes of bare Ni and comMoO3 materials. Another observation is the earlier onset of overpotential of mMoO3 materials than Pt/C material, which suggests hydrogen adsorption close to equilibrium. The Tafel study was also applied to mMoO3 under acidic condition (0.1 M H2SO4), shown in FIG. 15.

Figure 6C:
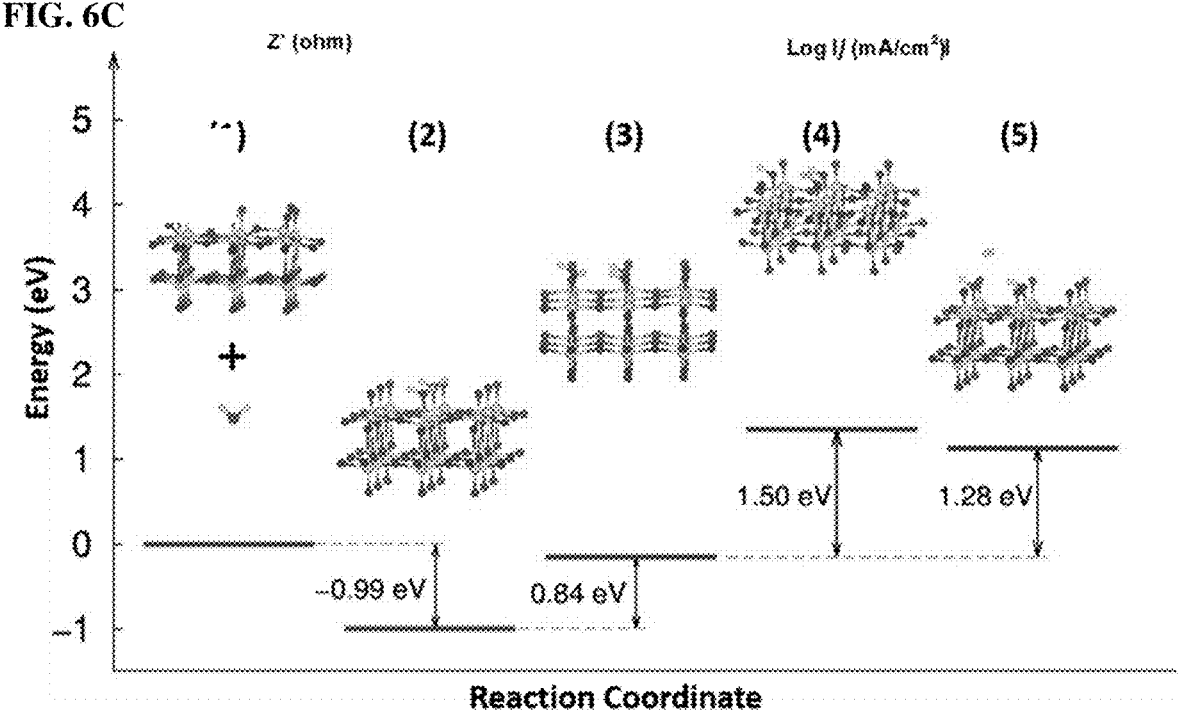
Figure 7:
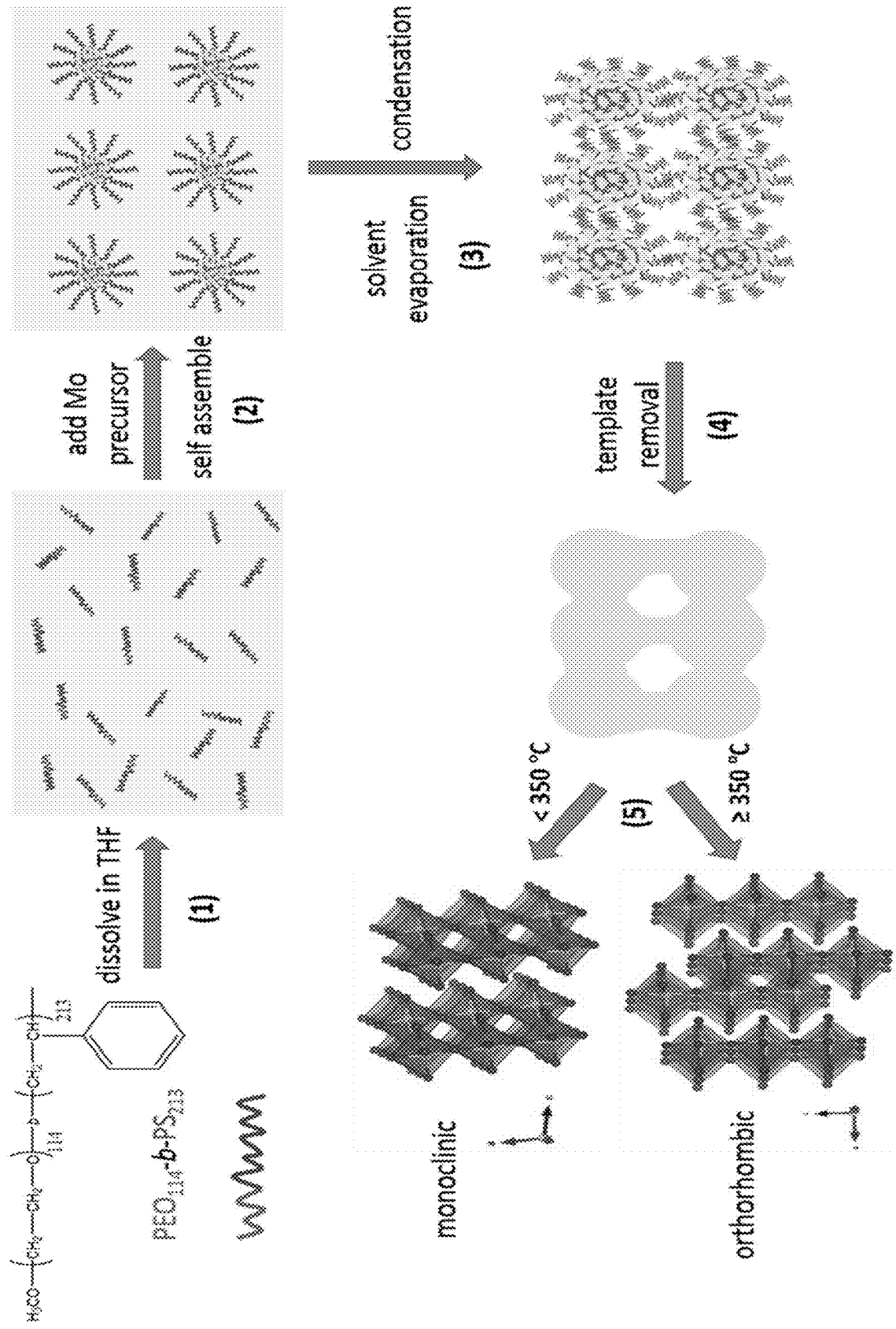
FIG. 7. The proposed formation mechanism of inverse micelle-templated mesoporous mMoO3.
Figure 16:
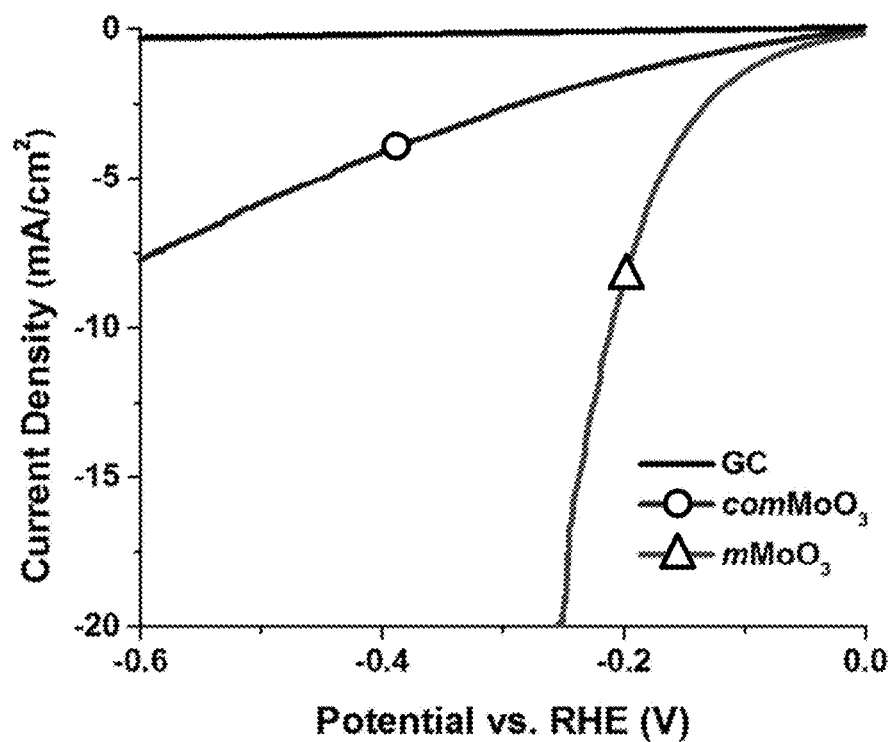
FIG. 16. HER polarization curves of $mMoO_3$ and com-$MoO_3$ samples on glassy carbon electrode. Bare glassy carbon electrode was applied for comparison.
Figure 17A:
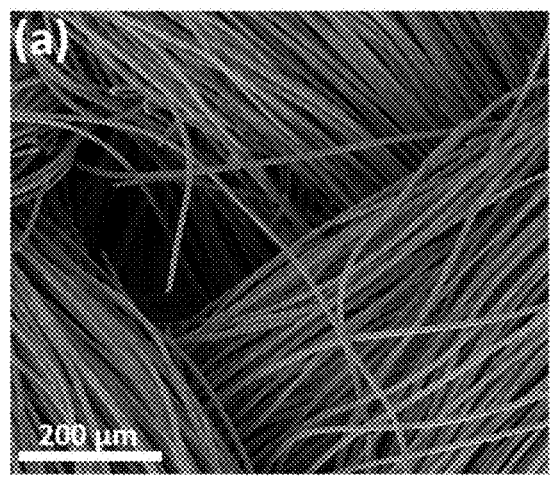
Figure 17B:
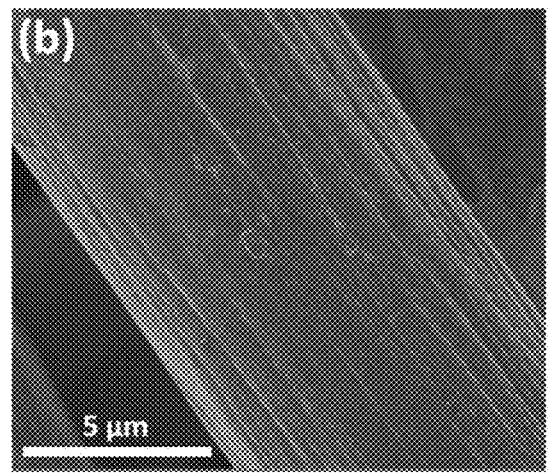
Figure 18B:
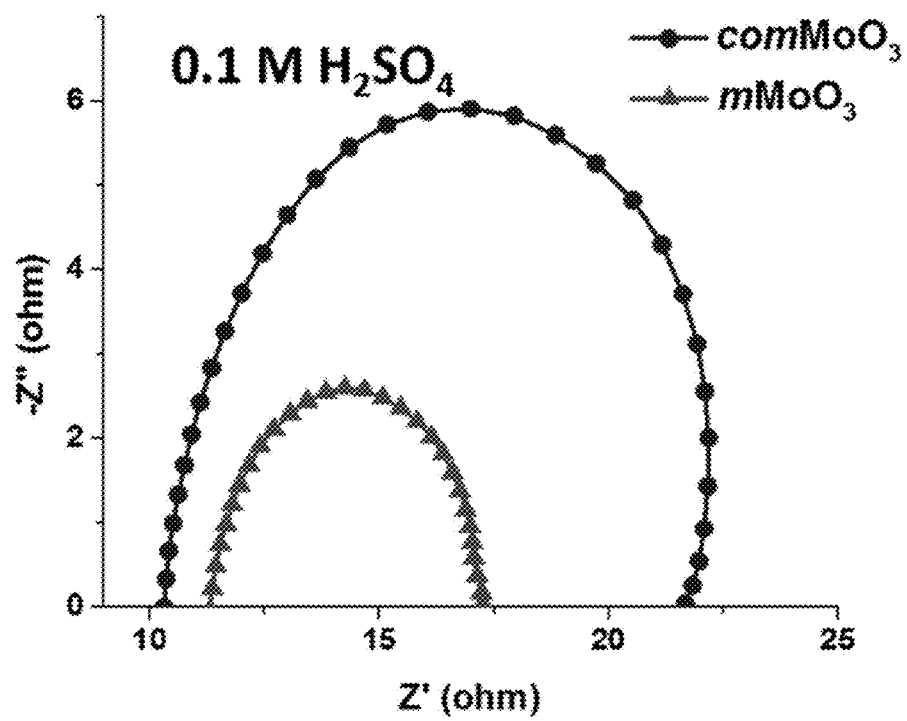

The HER pathway of mMoO3 was then schematically described in FIG. 6C based on DFT calculations. Because α-MoO3 has a layered structure and the site 1 oxygen vacancy (FIG. 4D) on the top of a layer is preferred for an oxygen vacancy to form, we then constructed a MoO3 slab based on these layers with the vacancy at this site. In alkaline solution, the reaction pathway mainly involved H2O (proton source) adsorption (transition state 2, FIG. 6C), reduction on the mMoO3 surface to form hydrogen atom adsorbed on the active site (transition state 3), followed by H2 formation (transition state 4) and desorption (transition state 5). Through DFT calculations, the oxygen vacancies close to Mo5+ were found to be the HER active sites. The initial state (1) in FIG. 6C is the mMoO3 with oxygen vacancies, surrounded by H2O molecules in the electrolyte. The energy barrier for transition state (2), H2O molecules adsorbed on the mMoO3 surface is found to be 0.99 eV. As a comparison, MoO3 material without any oxygen vacancies requires 1.69 eV (FIG. 16) to adsorb H2O molecules. The presence of oxygen vacancies significantly lowered the energy barrier for H2O adsorption. The transition state (3) is the reduction of adsorbed H2O molecules (H2Oads) and the formation of adsorbed hydrogen atoms (Hads). Since the mMoO3 material followed the Volmer-Heyrovsky mechanism in terms of the experimental Tafel value (43 mV/dec), the Hads would combine with another adjacent H2Oads. The last step (transition state 5) is the release of the formed H2 molecule. The H2 evolution energy barrier of mMoO3 material with oxygen vacancies is much smaller compared to MoO3 material without oxygen vacancies (1.29 eV vs. 2.63 eV, FIG. 6C vs. FIG. 16). Overall, the mMoO3 catalyst possesses suitable adsorption and desorption energy for H2 evolution. The presence of oxygen vacancies could lower the kinetic energy barrier by facilitating H2O adsorption and promoting H—H bond formation on two adjacent adsorbed Hads and H2Oads species.

Conclusion

In summary, a new mesoporous, crystalline MoO3-x material has been successfully synthesized and identified as a highly active electrocatalyst for HER through experimental and theoretical (DFT) studies. Through a novel, cost effective, and flexible method of dissolving cheap molybdenum in H2O2 as precursor, combined with a PEO-b-PS template, the as-synthesized material has unique properties of mesoporosity and oxygen-deficiency. The as-synthesized MoO3 has a much larger surface area (52 m2/g) than comMoO3 (2 m2/g), and shows outstanding performance in HER in both acidic and alkaline solution, without the assistance of carbon materials, extrinsic dopants, or other metal alloys. The calculated Tafel slope is as low as 43 mV/dec in 0.1 M KOH and the high activity can be maintained for more than 11 h. Compared to comMoO3 (66 S2), the as-synthesized mMoO3 has a much smaller charge transfer resistance (42 S2). The key factors are mesopores (20-40 nm) that facilitate the charge transfer, and the oxygen vacancies that narrow the bandgap leading to better conductivity. The oxygen vacancies that close to Mo5+ are regarded as active sites for HER. All experimental and theoretical data suggest the HER performance highly depends on the unique structure of mMoO3 materials. This study described a novel route to easily synthesize cheap, functional TMO materials with excellent HER activity and sheds light on the search for promising electrocatalysts for practical applications.

Experimental

Catalyst synthesis. In a typical synthesis, 0.26 g commercial MoO3 (comMoO3) was dissolved in 3 mL H2O2. After stirring for 2 days, a clear yellow gel was obtained. Then 0.1 g PEO-b-PS surfactant was dissolved in 7 mL THF solvent and stirred for 30 min. After all the surfactant was dissolved in THF, this solution was dropwise added to the clear yellow gel. After stirring for 30 min, the obtained homogeneous yellow gel was poured into a petri dish to evaporate THF at ambient conditions. After 24 hrs, the obtained clear film was collected and calcined at 350 or 450° C. for 3 hrs under air. The blue greyish mesoporous MoO3 calcined at 350° C. was prepared and labeled as mMoO3. The mesoporous MoO3 calcined at 450° C. is labeled as mMoO3-450.

Characterization. Powder X-ray diffraction (PXRD) analyses were performed on a Rigaku Ultima IV diffractometer (Cu Kα radiation, λ=1.5406 Å) with an operating voltage of 40 kV and a current of 44 mA. Raman spectra were taken on a Renishaw 2000 Raman microscope with a wavelength of 514 nm, exposure time of 16, and accumulations of 4 times. Nitrogen (N2) sorption experiments were conducted on a Quantachrome Autosorb-1-1C automated sorption system. The powders were degassed at 150° C. for 6 h prior to the measurements. The surface areas were calculated by the Brunauer-Emmett-Teller (BET) method, and the pore size distributions were calculated by the Barrett-Joyner-Halenda (BJH) method from the desorption isotherm. Morphological characterization was done using an FEI Nova NanoSEM 450 with an accelerating voltage of 2.0 kV. Transmission electron microscopy (TEM), high resolution transmission electron microscopy (HRTEM), and selected area electron diffraction (SAED) were obtained in a JEOL 2010 UHR FasTEM operating at an accelerating voltage of 200 kV. The samples were prepared by dispersing the material in methanol. A drop of the dispersion was placed on a carbon coated copper grid and allowed to dry under ambient condition. The powder samples were diluted in barium sulfate and pressed into the sample holder. X-ray photoelectron spectroscopy (XPS) measurements were performed in a PHI model 590 spectrometer with multiprobes (ΦPhysical Electronics Industries Inc.), using Al Kα radiation ($\lambda$=1486.6 eV) operated at 250 W. The shift of binding energy due to relative surface charging was corrected using the C 1s level at 284.6 eV as an internal standard. Diffuse reflectance ultraviolet-visible (DR UV-vis) spectra of the powder samples were collected with a diffuse reflectance apparatus attached on a Shimadzu UV-2450 ultraviolet-visible spectrophotometer. GPC measurements were performed using a Waters GPC-1 (1515 HPLC Pump and Waters 717Plus Autoinjector) equipped with a Varian 380-LC evaporative light scattering detector and a Waters 2487 dual absorbance detector, with three Jordi Gel fluorinated DVB columns (1-100 K, 2-10 K and 1-500 Å). Proton nuclear magnetic resonance (1H NMR) spectra were recorded on a Bruker Avance 300 MHz spectrometer.

Electrochemical studies. HER catalytic activity measurements were performed in a standard three-electrode system controlled by a CHI 660A electrochemistry workstation. The cell setup consisted of a working electrode (Ni foam or carbon foam) coated with the sample, an SCE reference electrode, a graphite rod electrode, and 0.1 M KOH or $H_2SO_4$ solution as the electrolyte. The reference was calibrated against and converted to a reversible hydrogen electrode (RHE). Linear sweep voltammetry was carried out at 5 mV/s for the polarization curves. All polarization curves were iR-corrected. The working electrode was prepared as follows: 10 mg of active material sample and 10 mg of carbon (VulcanXC-72) were dispersed in a mixture of deionized distilled water (DDW) and isopropanol (4 mL:1 mL) and sonicated for 3 min, followed by adding 20 µL of polytetrafluoroethylene (PTFE) solution (60% in water, Sigma) and sonicating for 5 min to form a suspension. A 20 µL suspension was deposited onto Ni foam or carbon foam using a micropipette. The catalyst loadings were 0.2 mg/cm2.

Preparation of Block Copolymers

Synthesis of Macroinitiator PEO114-Br: In a 50 mL flask, 10 g of monomethoxy polyethylene oxide (PEO114, Mn=5000) (2 mmol) and 0.404 g of triethylamine (4 mmol) were added in 80 mL of anhydrous $CH_2Cl_2$. The above solution was cooled to 0° C. and a solution of α-bromo isobutyryl bromide (0.736 g, 3.2 mmol) in 10 mL of $CH_2Cl_2$ was added slowly under vigorous stirring. After running the reaction for 2 h at 0° C., the solution was filtered to remove salts. The mixture was then concentrated and precipitated twice in cold diethyl ether. The PEO114 macroinitiator (PEO114-Br) was collected and dried at 40° C. under vacuum overnight.

Synthesis of PEO-b-PS by Atom Transfer Radical Polymerization (ATRP): In a typical procedure, in a 25 mL two-necked flask PEO114-Br (1.0 g, 0.2 mmol), CuBr (57.6 mg, 0.4 mmol), styrene (6.24 g, 60.0 mmol), anisole (4.0 mL), and PMDETA (167 µL, 0.8 mmol) were added. The reaction mixture was then degassed by using freeze-pump-thaw cycles for three times and then filled with argon. The flask was then placed in a preheated oil bath at 85° C. After the polymerization, the reaction was stopped by keeping the flask in a liquid nitrogen bath. Then THF was added to dilute the polymer solution and passed through a neutral $Al_2O_3$ column using THF as an eluent to remove the copper catalysts. The polymer solution was then concentrated and precipitated three times in n-hexane. The obtained polymer was then collected and dried at 40° C. under vacuum overnight. From gel permeation chromatography (GPC) measurements (polystyrene (PS) standards), the polymer was found to have an average number molecular weight (Mn, GPC) of 18.7 kg/mol and a polydispersity index (PDI) of 1.09. NMR showed a molecular weight of 27.1 kg/mol.

In FIG. 8A, the PXRD pattern of Mo hybrid sample shows a poor ordered structure with possible mixed phases, including $MoO_3$, $MoO_2$, and $Mo_2C$. The standard patterns of these phases are listed for comparison. Compared to the $MoO_3$ PDF #05-0508 pattern, the diffraction lines of Mo hybrid sample at 23.3°, 25.7°, and 27.3° are corresponding to (110), (040), and (021) planes of α-$MoO_3$. The (211) and (312) planes of the monoclinic $MoO_2$ (PDF #32-0671) at 37.0° and 53.5° can also be observed in the Mo hybrid sample. The low diffraction intensity may due to the existence of amorphous carbon species in the Mo hybrid sample. In Raman spectroscopy, the Mo—O covalent bonds were further studied. The vibrational modes at 818 and 995 cm−1 are attributed to the symmetric O—Mo—O bond and the asymmetric terminal oxygen Mo=O of the orthorhombic phase, respectively. It is possible that partial carbon atom may replace oxygen, due to the observation of vibrational modes at 828 and 1006 cm−1 which corresponds to $Mo_2C$ phase. The strongest two peaks at ~1350 cm−1 and ~1580 cm−1 in FIG. 8B are attributed to the D band and G band of carbon species in Mo hybrid sample. Above all, the covalent bonds between Mo atoms and the PEO-b-PS template can be confirmed.

The m$MoO_3$ sample exhibits four main vibrational modes. The modes observed at 992, 858, 549, and 440 cm−1 index to polyoxomolybdates and possess Mo—O—Mo bonding (900-600 cm−1) and mononuclear oxomolybdates that possess Mo=O and Mo—O bonding types (600-400 cm−1), respectively. No obvious carbon species can be observed, indicating the thermal treatment was able to remove most of the template. For comparison, the fresh made Mo hybrid sample (without high temperature calcination) was also studied. In the Mo hybrid sample, the existence of carbon species can be easily identified by observing C=O stretches, C=C stretches, and C-H bends in the range of 1400-1600 cm−1.[5]

The m$MoO_3$ sample after stability test was collected, washed, and vacuum dried. In Raman spectra (FIG. 13), by comparing m$MoO_3$ before and after stability, no new or missing vibrational bands can be observed, suggesting the orthorhombic phase of m$MoO_3$ remains unchanged during the 12 h stability test. However, an obvious peak broadening can be observed at ~666 cm−1. This may be due to the polytetrafluoroethylene (PTFE) we used as a binder during HER tests. As reported, the CF2 wagging and CF3 symmetric deformation of PTFE contribute to Raman bands at 735 cm−1and 594 cm−1, respectively.

Figure 14A:
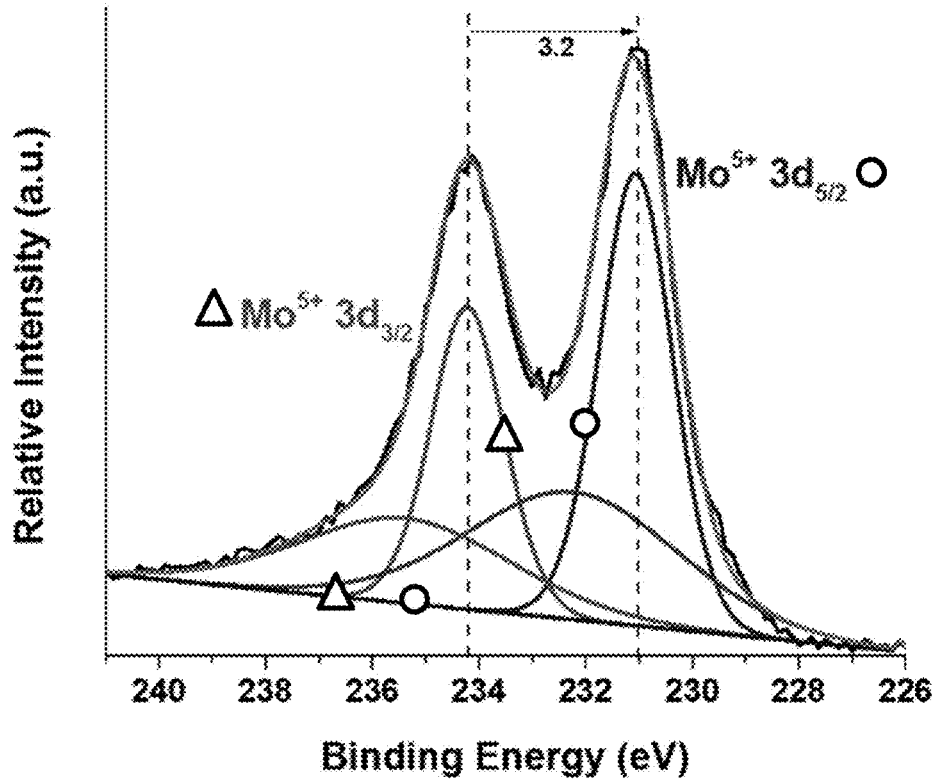
FIGS. 14A and 14B. XPS spectra details for $mMoO_3$ sample after stability test in 0.1 M KOH. (14A) Mo 3d binding energy regions, and (14B) O 1s level.
Figure 14B:
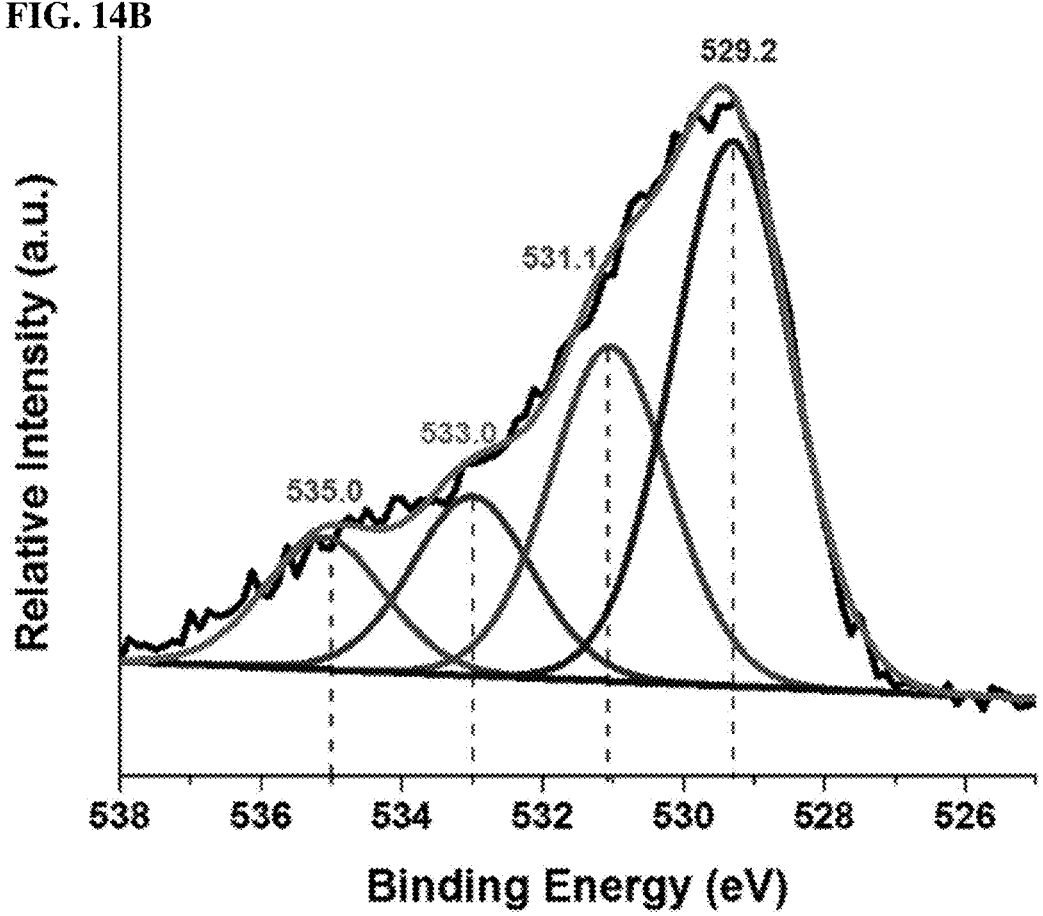

In XPS (FIG. 14A) results, the Mo5+ oxidation states of in mMoO3 are preserved by showing the major Mo 3d5/2 and Mo 3d3/2 binding energy levels at 231 eV and 234.2 eV, respectively (vs. before stability test in FIG. 3A). The analysis of fitted curves show two minor peaks corresponding to Mo6+, which we didn't observe in the as-prepared mMoO3. The XPS spectra provided evidence that the hydrogen evolution reaction led to a partial oxidation of Mo5+ to Mo6+. This may be due to the adsorbed H2O (H2Oads) filled the active site (oxygen vacancies) during HER. As proposed in the discussion part, the reduction of H2Oads is an important process. During this process, Mo5+ would be oxidized to Mo6+. Electrons can be effectively transferred between the Mo5+ site and oxygen vacancy site. Most importantly, oxygen vacancies can be reactivated by the release of H2 and OH—. The analysis of O 1s level on mMoO3 sample after stability tests is shown in FIG. 14B. Compared to FIG. 3B, a new binding energy level which corresponding to adsorbed molecular water can be seen at 535.0 eV. This suggests that the mMoO3 material is able to adsorb H2O molecules during HER. Moreover, the major contributed peak was preserved at 529.2 eV compared to as-prepared mMoO3 sample (FIG. 3B), indicating good stability of lattice oxygen in mMoO3 during HER. In terms of the characterization results, the mMoO3 sample is intact after stability tests. The crystal phase and chemical states of mMoO3 were preserved during HER, making a reusable electrocatalyst.

Band gap energy calculation from absorbance:

$$E = h\nu = \frac{hc}{\lambda}$$

$h$: the Planck constant $c$: the speed of light $\lambda$: wavelength $$E = 6.63 \times 10^{-34} \frac{m^2 \, kg}{s} \times \frac{3.0 \times \frac{10^8 \, m}{s}}{420 \times 10^{-9} \, nm}$$

$$= 4.74 \times 10^{-19} \frac{m^2 \, kg}{s^2}$$

$$= 4.74 \times 10^{-19} \, J$$

$$= \frac{4.74 \times 10^{-19}}{1.6 \times 10^{-19}} \, eV$$

$$\approx 2.96 \, eV$$

TABLE 1

Figure 15:
FIG. 15. Photo was taken during HER using mMoO3 sample, H2 bubbles can be clearly observed on the electrode surface.

Impedance Components for HER Determined by Fitting the Experimental Data Measured in 0.1M KOH Using the Equivalent Circuit Shown in FIG. 15.

| | $R_s$ (Ω) | | $R_{ct}$ (Ω/cm²) | | CPE-T(mF/cm²) | | CPT | |
|---|---|---|---|---|---|---|---|---|
| | Value | Error (%) | Value | Error (%) | Value | Error (%) | Value | Error (%) |
| MoO3 | 6.12 | 1.00 | 65.79 | 1.28 | 1.24 | 4.06 | 0.68 | 1.05 |
| mMoO3 | 3.94 | 0.58 | 42.95 | 0.74 | 1.576 | 2.28 | 0.79 | 0.56 |

The magnitude of CPE is determined by values CPE-T and CPE-P. CPE-P is the fitting parameter, if CPE-P is close to 1, the CPE will serve as an ideal double layer capacitor (Cdl). CPE-T represents the capacitance value of constant phase element, which can evaluate the electrochemical active surface sites. As illustrated in Table 1, the values of CPE-P of all three materials ranging from 0.68 to 0.79, indicating the capacitive behavior of all catalysts.

TABLE 2

Impedance Components for HER Determined by Fitting the Experimental Data Measured in 0.1M H2SO4 Using the Equivalent Circuit Shown in FIGS. 17A, 17B, 17C, and 17D.

| | $R_s$ (Ω) | | $R_{ct}$ (Ω) | | C (mF/cm²) | |
|---|---|---|---|---|---|---|
| | Value | Error (%) | Value | Error (%) | Value | Error (%) |
| comMoO3 | 10.57 | 1.33 | 11.86 | 2.29 | 1.64 | 4.29 |
| mMoO3 | 11.58 | 0.74 | 5.51 | 2.15 | 2.44 | 4.76 |

Figure 24:
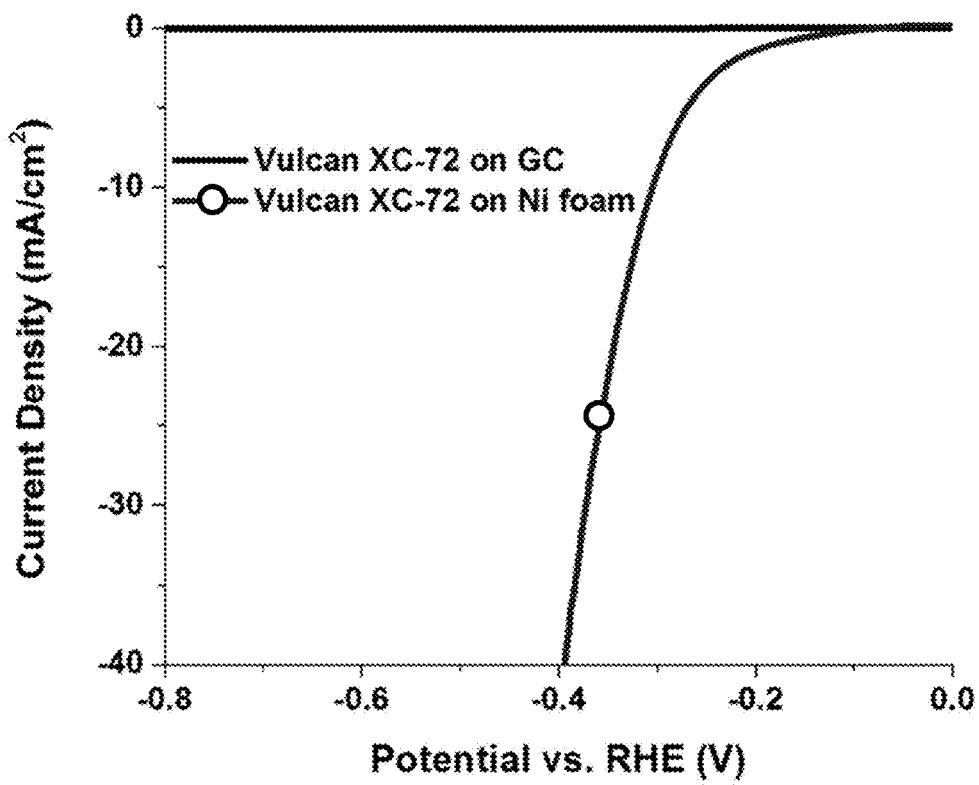
FIG. 24. HER polarization curves of Vulcan XC-72 sample on glassy carbon and on Ni foam (circle).

The HER polarization curves on Vulcan XC-72 in 0.1 M KOH electrolyte with different electrodes (GC and Ni foam) are shown in FIG. 24. No activity can be observed for Vulcan XC-72 on GC electrode. The activity of Vulcan XC-72 on Ni foam electron was attributed to Ni foam (compared to bare Ni foam in FIG. 5A). Vulcan XC-72 has no contribution to HER performance. The main reasons for Vulcan XC-72 being widely used were due to its high surface area (250 m2/g) which is sufficient to accommodate a high loading of catalyst and the presence of a small amount of micropores.[8]

Figure 25:
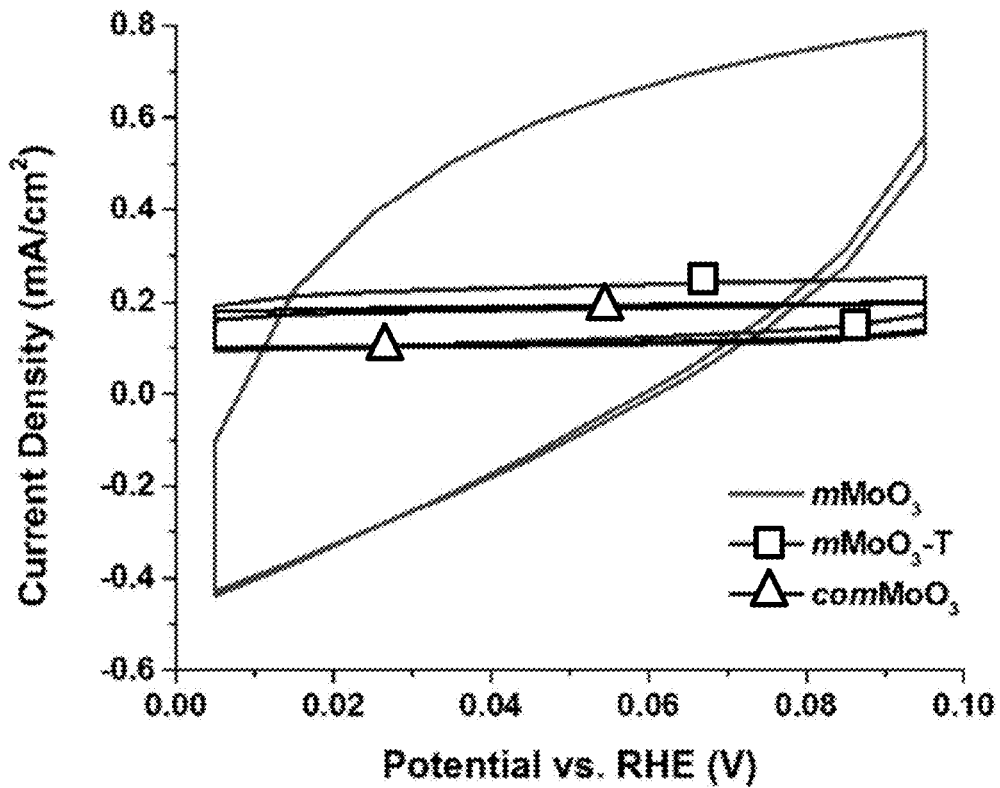
FIG. 25. Cyclic voltammetry curves of mMoO3, mMoO3-T, and comMoO3 samples in the region of 0-0.1 V vs. RHE.
Figure 26:
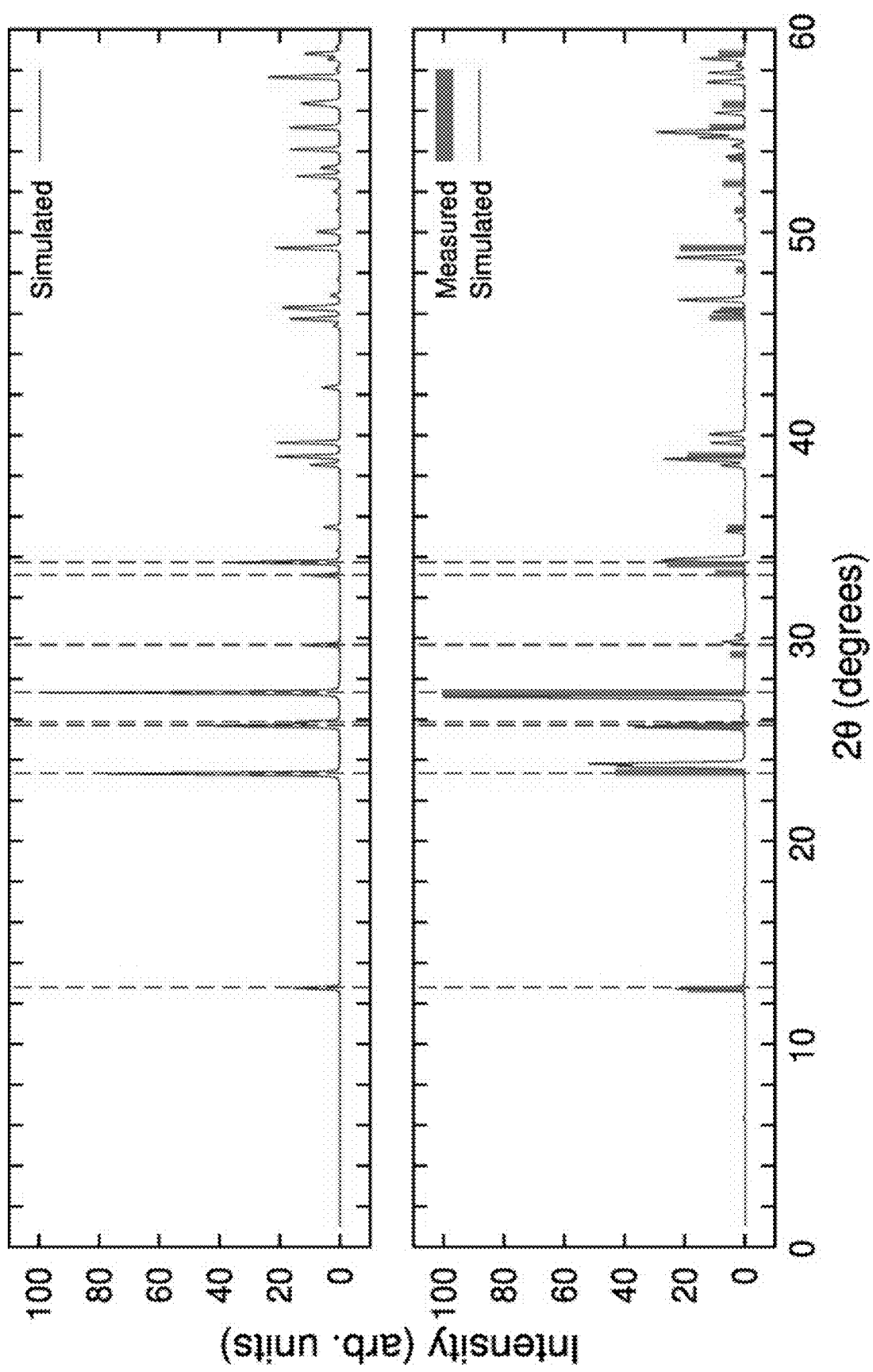
FIG. 26. (Top) Simulated XRD pattern of the Pnma phase of MoO3 and (Bottom) the simulated and measured XRD pattern of MoO3 crystals with vacancies. Dotted lines indicate the position of some main peaks experimentally measured for MoO3 without vacancies.
Figure 27:
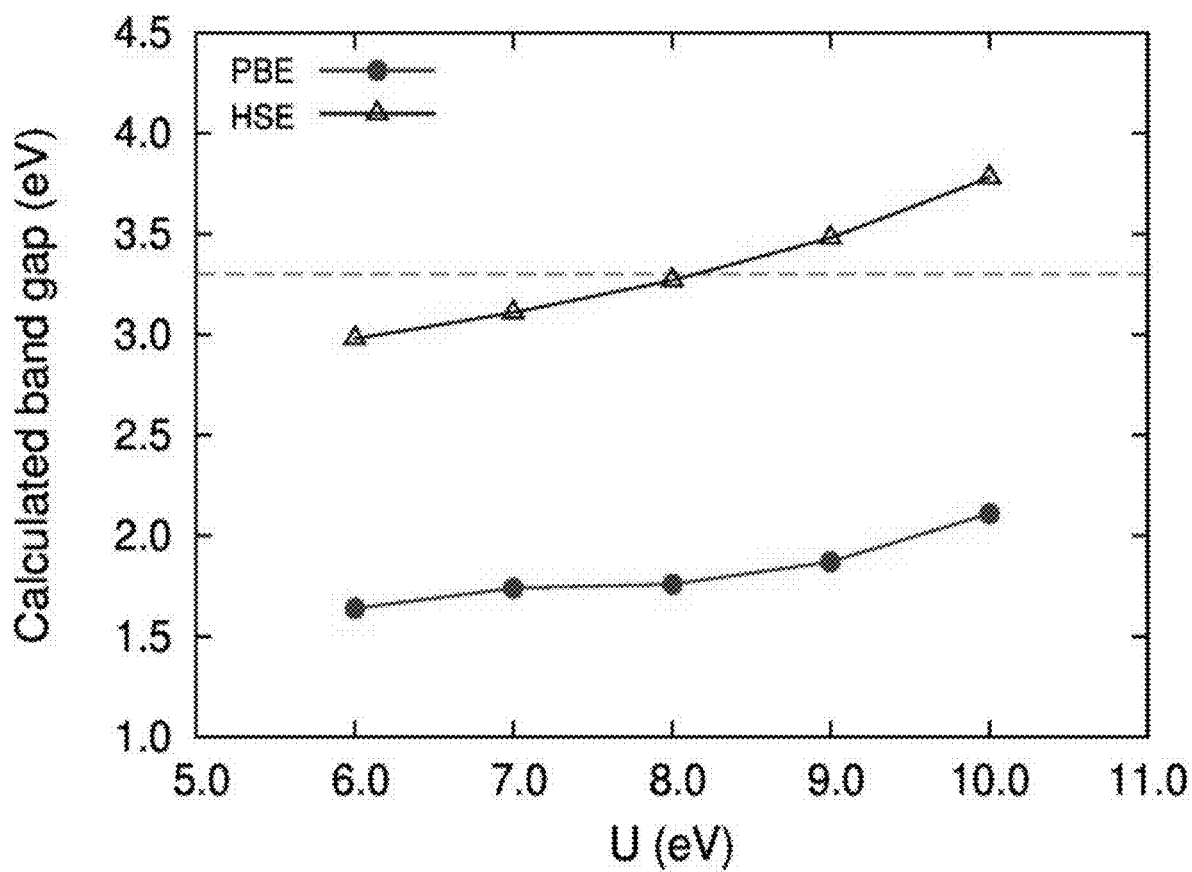
FIG. 27. Computed band gap $E_g$ of α-$MoO_3$ using PBE and HSE approaches of DFT. Dashed line represent the experimental value $E_g$=3.3 eV of α-$MoO_3$.

All the electrodes were assumed to have a pure double layer in the test voltage range. CV was conducted in 0.5 M H2SO4 solution with a scan rate at 5 mV/s. In FIG. 25, the cyclic voltammetry curves of as prepared mMoO3, O2-TPO treated mMoO3 (mMoO3-T), and comMoO3 sample have been investigated on glassy carbon electrodes (surface area 0.126 cm2). The electrochemically active surface area (EASA) of each catalyst can be determined using the following equation[9]:

The Cdl is the electrochemical double-layer capacitance. Cs is the specific capacitance of an atomically smooth planar surface of the material per unit area.[10] However, the exact value of the EASA is difficult to determine due to the unknown capacitive behavior of each catalyst (Cs of each catalyst). The electrochemical double-layer capacitance was measured to estimate the EASA.[11] The Cdl is given by the following equation:

The double layer charging current (ic) is equal to the product of scan rate (v) and double layer capacitance. With the value of Cdl, the EASA of each sample can then be estimated with the following trend: mMoO3 (13 mF/cm2)>comMoO3 (0.5 mF/cm2)>mMoO3-T (0.3 mF/cm2).

Figure 19A:
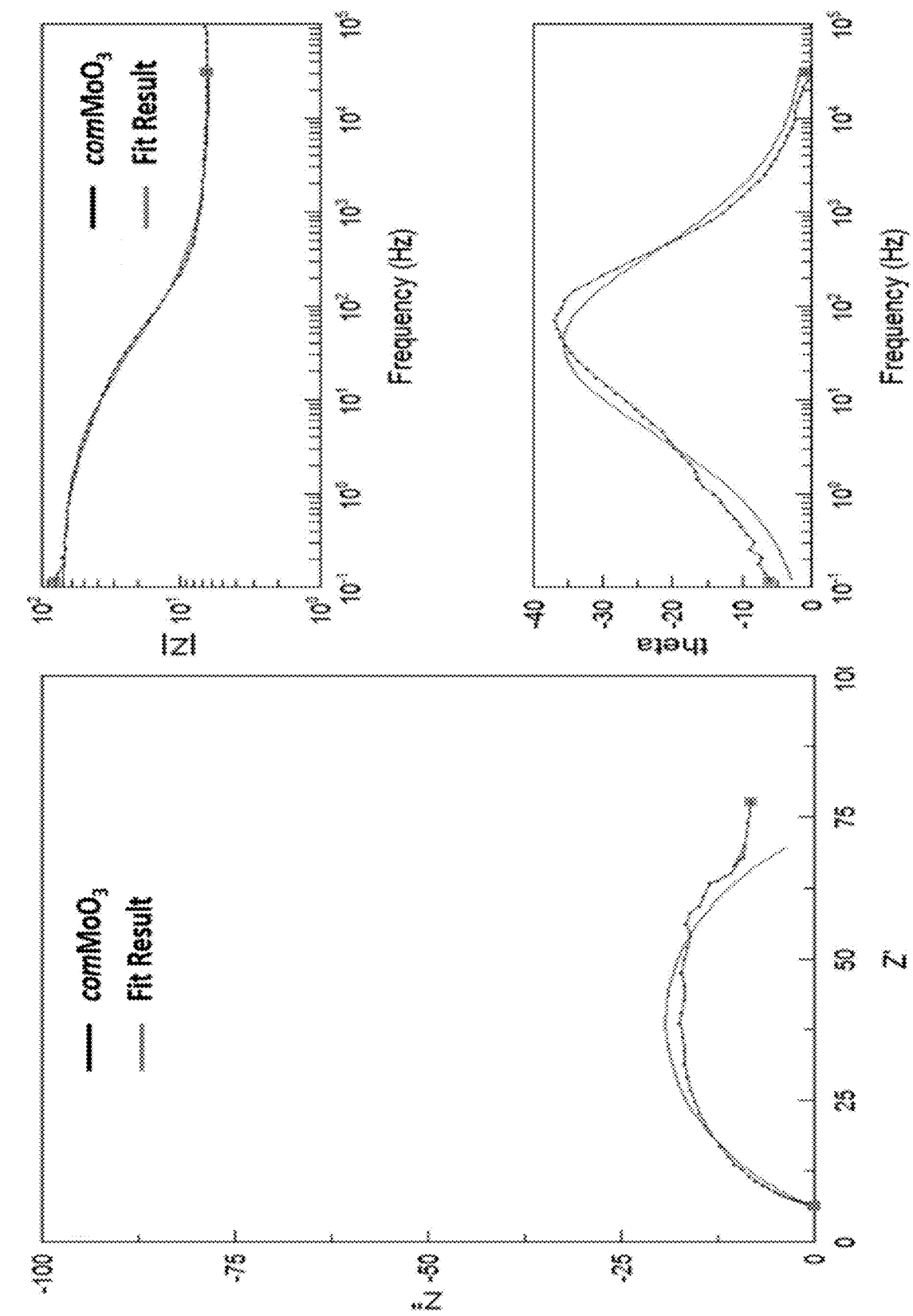
FIGS. 19A and 19B. Representative as-received and mechanically polished Nyquist impedance, Bode plots and phase angle for bare (19A) $comMoO_3$, (19B) $mMoO_3$ samples in 0.1 M KOH.
Figure 19B:
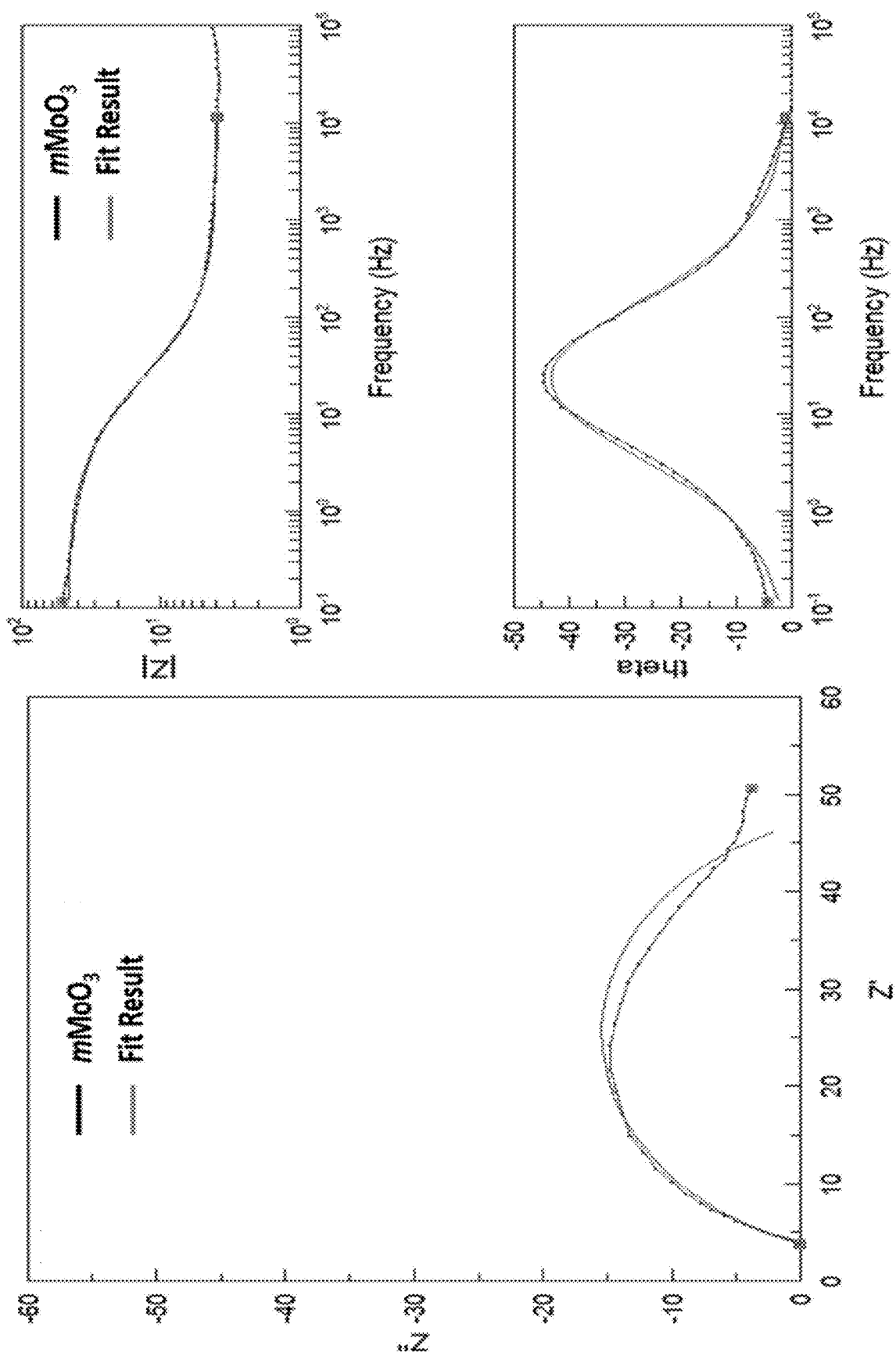
Figure 21A:
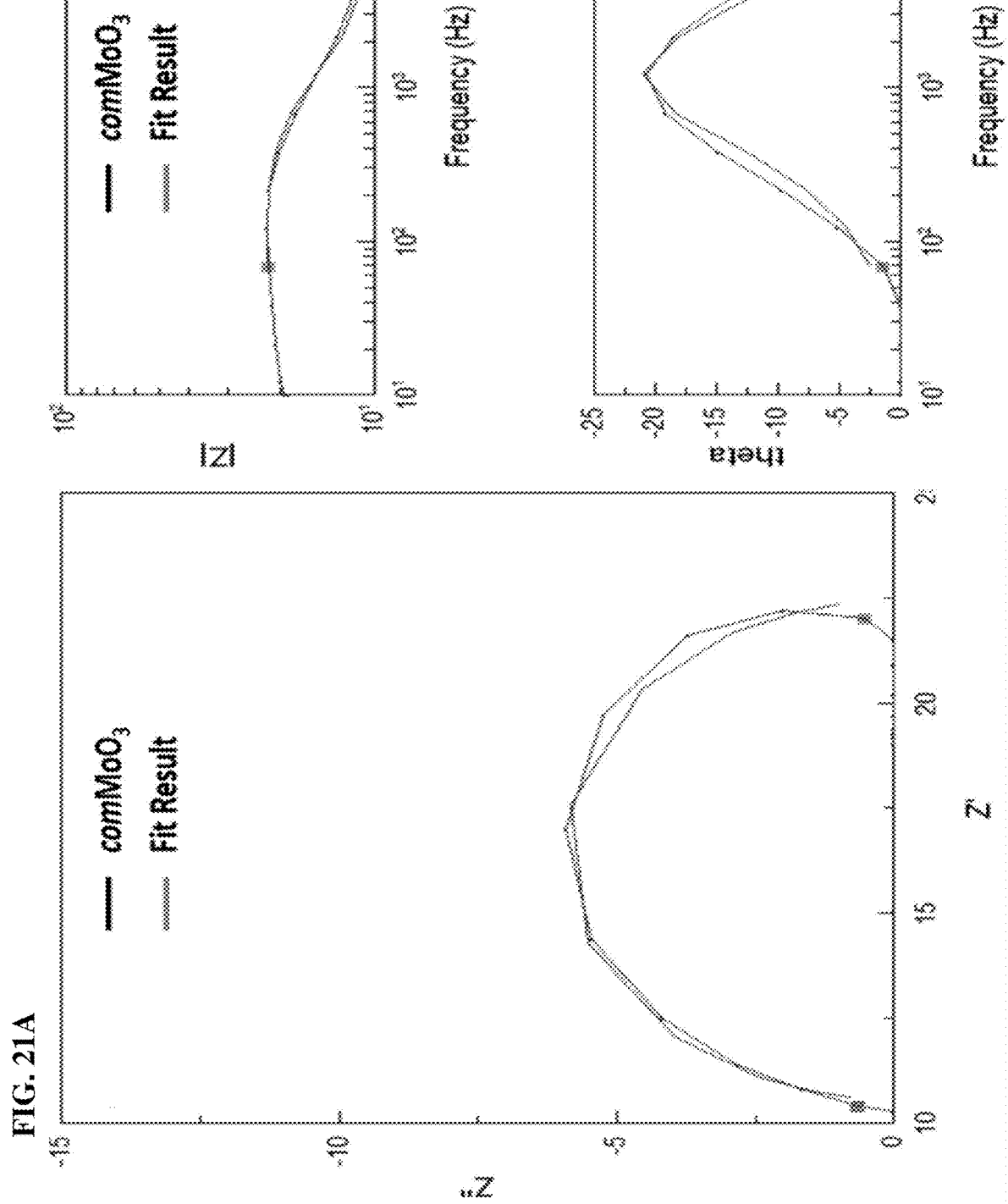
FIGS. 21A and 21B. Representative as-received and mechanically polished Nyquist impedance, Bode plots and phase angle for bare (21A) $comMoO_3$, (21B) $mMoO_3$ samples in 0.1 M $H_2SO_4$.
Figure 21B:
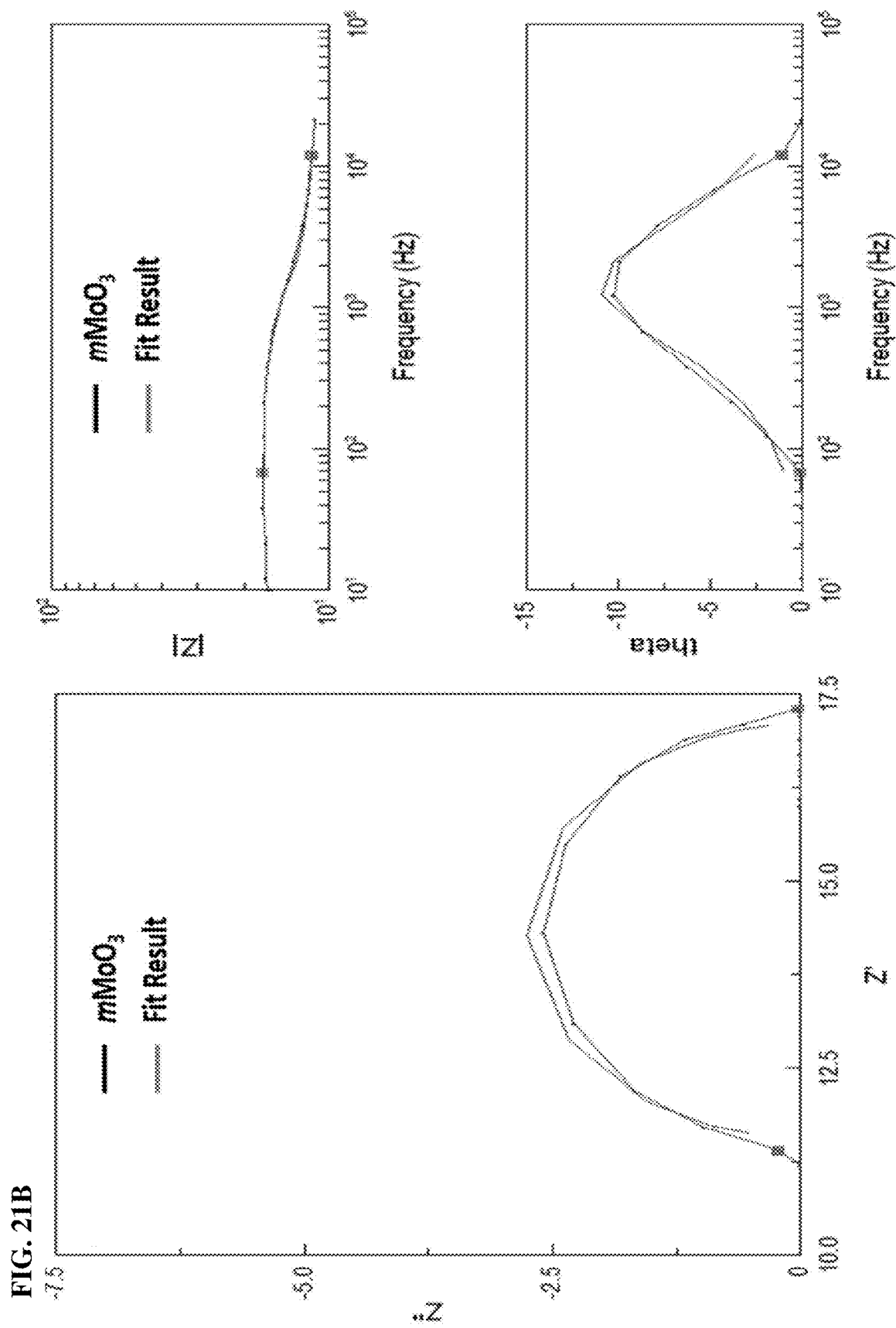
Figure 22:
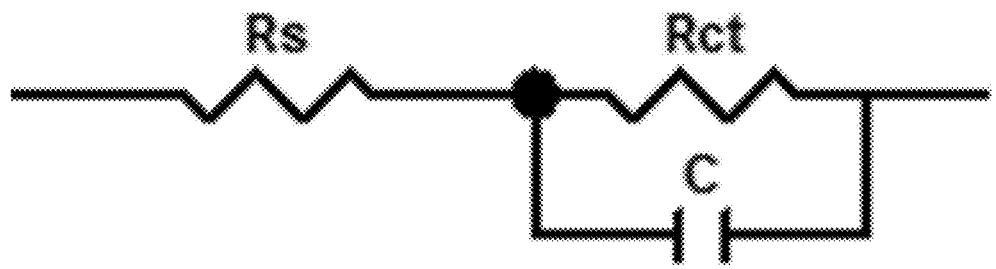
FIG. 22. Equivalent circuit used to obtain charge transfer resistance of the HER catalysts in 0.1 M $H_2SO_4$. $R_s$: resistance of the electrolyte; $R_{ct}$: charge transfer resistance; CPE: constant phase element.
Figure 23:
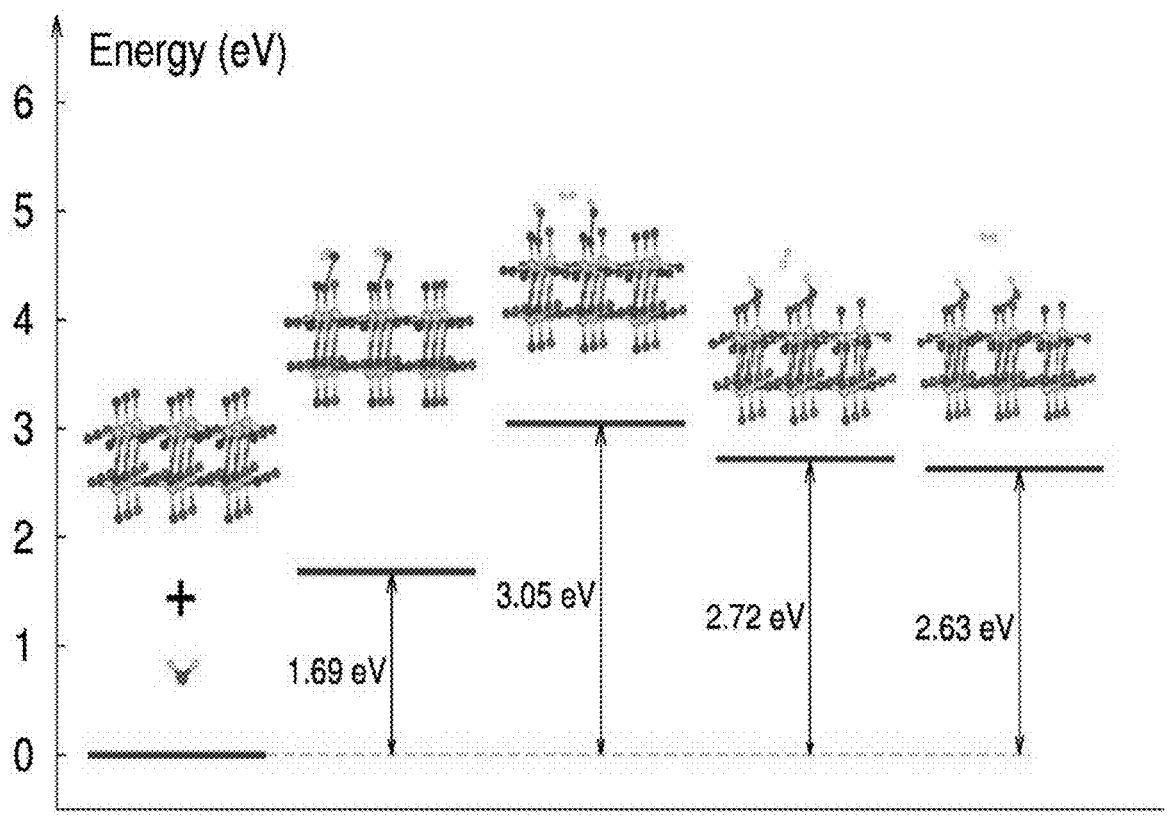
FIG. 23. The HER pathway of $MoO_3$ sample without any oxygen vacancies.

The quantum mechanical simulations of MoO3 were performed with density functional theory (DFT)[12], [13] as implemented in the Vienna Ab initio simulation package, [14] using the Perdew-Burker-Ernzerhof (PBE) functional for the exchange-correlation (XC) energies. The kinetic plane-wave cutoff of 400 eV was used and the convergent criterion that all the atomic forces are smaller than 0.01 eV/A. With this computational scheme, the optimized lattice parameters of the orthorhombic Pnma structure of MoO3 (α-MoO3) are a=13.72 Å, b=3.67 Å, and c=3.82 Å, being within 1-2% of the experiment values. α-MoO3 has a layered structure with three different sites of oxygen, as shown in FIG. 4D. Of them, a vacancy at site 1 is thermodynamically most stable, being lower than site 2 and site 3 by 1.06 eV and 1.90 eV, respectively. We then considered the effects of oxygen vacancies at site 1. Due to the voids at vacancy sites, the lattice parameters of the MoO3 crystal are altered, leading to some detectable shifts in the XRD pattern. Although the lattice parameters of α-MoO3 optimized by DFT are about 1-2% from the experimental values, this discrepancy is comparable with the effect of vacancies. Therefore, we fitted the optimized parameters α-MoO3 (without vacancies) to the experimental values, and applied the same relative corrections to the optimized structures of α-MoO3 with vacancies. XRD patterns were then determined on the corrected structures with the help of FullProff Suite, using the same Cu Kα wavelength λ=1.54 Å with the measurements. The simulated and measured XRD patterns are shown in FIGS. 19A, and 19B. The structural changes due to vacancies and the merging of two peaks near 25.76 degrees into one can be observed.

Figure 20:
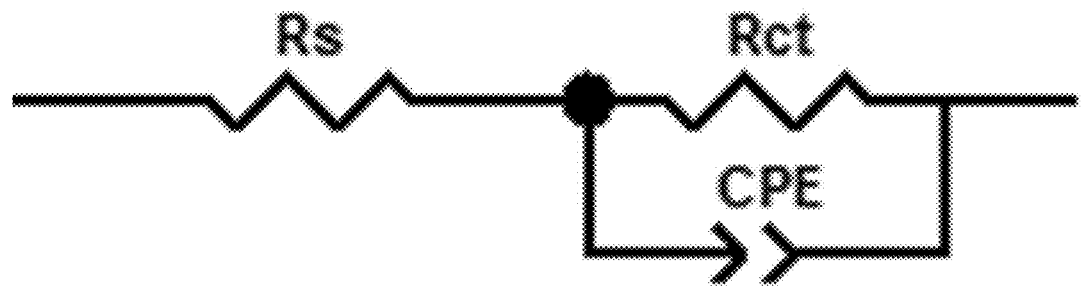
FIG. 20. Equivalent circuit used to obtain charge transfer resistance of the HER catalysts in 0.1 M KOH. $R_s$: resistance of the electrolyte; $R_{ct}$: charge transfer resistance; CPE: constant phase element.

Simulating the electronic structure of MoO3 with DFT is challenging. With a conventional (local or semilocal) XC functional like PBE, the fundamental gap is typically underestimated by 30% or more. One of the most common solutions for this problem is to use a non-local functional such as Heyd-Scuseria-Ernzerhof XC for these energies with a considerably high computational cost. Even in this case, systems with strongly correlated d and f electrons like MoO3 remain rather problematic as DFT tends to delocalize these electrons, significantly altering the electronic structure. Within the Dudarev's approach, an onsite Coulomb term, denoted by U, is introduced to penalize the computation-originated delocalization (FIG. 20). This parameter was chosen beforehand to be 6.3 eV for Mo (of MoO3) in some studies. While an attempt to calibrate U from 0.0 eV to 8.0 eV based on the lattice parameters could not result in a conclusive answer.

This important parameter was callibrated by computing the band gap Eg of MoO3 at the HSE level of DFT, and then determining U so that the computed Eg is equal to the experimental value, which is 3.3 eV for α-MoO3. The calculated results of Eg are shown in FIG. 20, indicating that while Eg determined with PBE is very small, that computed with HSE is in good agreement with the experimental band gap. Moreover, we determined that U=8.1 eV is the parameter needed to reproduce the band gap of 3.3 eV and the electronic structure of α-MoO3. In fact, with this value of U, we obtained Eg=3.28 eV. Three inequivalent sites of O in α-MoO3, as shown in FIG. 4D, lead to different electronic characteristics. Considering vacancies at these sites, we computed the corresponding electronic band structures and show them in FIG. 4C. These band structures are computed at the PBE level of DFT by which the band gap is underestimated. Clearly, at this level of theory, the reduction of Eg by vacancies, as noted in the literature, can be clearly observed. Our calculations with HSE revealed that the band gap of α-MoO3 with vacancies at sites 1, 2, and 3 are 1.63 eV, 2.31 eV, and 1.20 eV, respectively.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

The invention claimed is:

1. A mesoporous metal oxide having nano-sized wall crystallinity, mesopore size of from about 5 nm to about 500 nm, a surface area of from about 5 $m^2/g$ to about 100 $m^2/g$, a transfer resistance of from about 20Ω to about 60Ω, wherein the mesopores are dispersed between nanoparticles and are not of a uniform shape.

2. The mesoporous metal oxide of claim 1, wherein the mesoporous metal oxide comprises mesopore size of from about 20 nm to about 40 nm, a surface area of from about 40 $m^2/g$ to about 60 $m^2/g$, a transfer resistance of from about 30Ω to about 50Ω.

3. The mesoporous metal oxide of claim 1 or 2, wherein, mesoporous metal oxide electrocatalyst is active and stable in both acidic and alkaline solution.

4. The mesoporous metal oxide of claim 1, wherein the mesoporous metal oxide is mesoporous $MoO_{3-x}$.

5. The mesoporous metal oxide of claim 4, wherein the mesoporous metal oxide serves as an HER electrocatalyst without the assistant of at least one of carbon materials, noble metals, or $MoS_2$ materials.

6. The mesoporous metal oxide of claim 1, wherein the mesoporous metal oxide has mesopores of pore size of from about 20 nm to about 40 nm, an over potential of from about 0.01 to about 0.20V and resistance of from about 20Ω to about 60Ω.

7. The mesoporous metal oxide of claim 1, wherein the mesoporous metal oxide is incorporated into at least one of a redox catalyst, a supercapacitor, a battery or combination thereof.

8. The mesoporous metal oxide of claim 1, wherein the mesoporous metal oxide has oxidation states of Mo5+ and Mo6+.

* * * * *